US010261954B2

(12) United States Patent
Grace, Jr. et al.

(10) Patent No.: US 10,261,954 B2
(45) Date of Patent: Apr. 16, 2019

(54) OPTIMIZING SEARCH RESULT SNIPPET SELECTION

(71) Applicant: Dropbox, Inc., San Francisco, CA (US)

(72) Inventors: John Robert Grace, Jr., Oakland, CA (US); Neil Sethi, San Francisco, CA (US); Tsung-Hsiang Chang, San Bruno, CA (US)

(73) Assignee: Dropbox, Inc., San Francisco, CA (US)

( * ) Notice: Subject to any disclaimer, the term of this patent is extended or adjusted under 35 U.S.C. 154(b) by 0 days.

(21) Appl. No.: 15/639,909

(22) Filed: Jun. 30, 2017

(65) Prior Publication Data
US 2018/0189292 A1 Jul. 5, 2018

Related U.S. Application Data

(66) Substitute for application No. 62/440,549, filed on Dec. 30, 2016.

(51) Int. Cl.
| | | |
|---|---|---|
| *G06F 17/30* | (2006.01) | |
| *G06F 16/2457* | (2019.01) | |
| *G06F 16/93* | (2019.01) | |
| *G06F 16/338* | (2019.01) | |
| *G06F 3/0482* | (2013.01) | |

(52) U.S. Cl.
CPC ...... *G06F 16/24578* (2019.01); *G06F 16/338* (2019.01); *G06F 16/93* (2019.01); *G06F 3/0482* (2013.01)

(58) Field of Classification Search
None
See application file for complete search history.

(56) References Cited

U.S. PATENT DOCUMENTS

| | | | |
|---|---|---|---|
| 9,646,260 B1 * | 5/2017 | Tunstall-Pedoe | G06N 99/005 |
| 2007/0174237 A1 * | 7/2007 | Wilbrink | G06F 17/30902 |
| 2007/0266025 A1 * | 11/2007 | Wagner | G06F 17/30867 |
| 2010/0082566 A1 * | 4/2010 | Wang | G06F 17/30648 707/705 |
| 2012/0117093 A1 * | 5/2012 | Shilovitsky | G06F 17/30557 707/755 |
| 2012/0254218 A1 * | 10/2012 | Ali | G06F 17/30672 707/765 |
| 2015/0161130 A1 * | 6/2015 | Liu | G06F 17/3053 707/723 |
| 2015/0169753 A1 * | 6/2015 | Xian | G06F 17/30864 707/722 |

* cited by examiner

*Primary Examiner* — Alex Gofman
(74) *Attorney, Agent, or Firm* — Hickman Palermo Becker Bingham LLP; Adam C. Stone

(57) ABSTRACT

Techniques for optimizing search result snippet selection. In one aspect, the techniques include receiving a query and identifying a set of documents matching the query. A set of one or more snippet field types for a snippet representing a corresponding document of the set of documents is selected based at least in part on a snippet selection model. The snippet selection model is adjusted to reinforce or discourage selection of the set of one or more snippet field types for future queries based on the user click.

19 Claims, 8 Drawing Sheets

OPTIMIZING SEARCH RESULT SNIPPET SELECTION

PRIORITY CLAIM

This application claims the benefit of priority of provisional application No. 62/440,549, filed Dec. 30, 2016, the entire contents of which is hereby incorporated by reference as if fully set forth herein.

TECHNICAL FIELD

Aspects of the present disclosure relate generally to text-based information retrieval computer systems, and more specifically to computer-implemented techniques for optimizing search result snippet selection.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Various techniques exist for an information retrieval computer system to present documents to a user that match a given query. These techniques generally operate by computing ranking scores for the matching documents according to a relevance scoring model. The matching documents are then presented to the querying user in order of their ranking scores. For example, the matching documents may be presented to the querying user as a search result in a web page or other graphical user interface.

A search result may provide digests, synopses or other summaries of the matching documents. The summaries may be presented in the user interface in order of the ranking scores of the corresponding documents. For example, the summary of the matching document with the highest or best ranking score for the most relevant matching document may be presented near the top of the user interface above the summaries for relatively less relevant matching document.

A summary presented to a user as part of a search result may also be actionable by the user with user input. For example, by clicking on or otherwise directing user input toward a summary for a matching document, the user may be able to command some action on the matching document such as downloading the matching document, viewing the matching document, opening the matching document, or some other action appropriate for the matching document.

For text-based information retrieval systems, the ranking scores computed for matching documents are often a function of the query terms in the query. For example, the ranking score for a matching document may be a function of the variance between the matching document's term frequency (TF) and the matching document's inverse document frequency (IDF). The matching document's term frequency (TF) may be a function of how many times each query term appears in the matching document. The matching document's inverse document frequency (IDF) may be a function of how many items in a corpus of documents each query term appears. The variance may be computed as the product of the matching document's term frequency (TF) and the matching document's inverse document frequency (IDF).

A term frequency-inverse document frequency (TF-IDF)-based ranking function may normalize TF and IDF according to a probabilistic information retrieval framework to compute ranking scores that more accurately reflect relevance. For example, the widely-used BM25 family of ranking functions dampen the effect of a relatively large term frequency (TF) and adjust the term frequency (TF) based on the length of the matching document relative to the average length of documents in the corpus to which the matching document belongs.

In addition to a query-dependent score, such as a BM25 score mentioned above, a ranking function may incorporate a non-query dependent (query independent) score. A query independent score may reflect the relevance of a matching document based on various metrics that are independent of how well the document matches the query. One example of an algorithm for computing a query independent score is the PageRank algorithm which computes a query independent score based on the number and the quality of documents that link (refer) to a matching document. There are many other types of query independent scores and different algorithms for computing them.

One challenge facing designers and operators of text-based information retrieval systems is what weights to apply to each of the individual query-dependent and query-independent field scores on which the ranking function is based. As a simple example of the challenge faced, a query-dependent score may be based on two individual query-dependent field scores. One of the individual query-dependent field scores may be, for example, a BM25 score on the title of a matching document while the other individual query-dependent field score may be a BM25 score on the body of a matching document. Intuitively, the designer or operator may configure the ranking function to assign more weight to the BM25 score for the title relative to the weight assigned to the BM25 score for the body on the assumption that users will consider a query term match on the title to be more relevant than a match on the body.

To assign the weights, the designer or operator may engage in trial and error. For example, the designer or operator may submit what are believed to be representative queries to the information retrieval system and "eyeball" the search results to see if the most relevant items are presented as expected. If the search results are not as expected, then the weights may be adjusted and representative queries submitted again to verify the adjustment. This process of trial and error may be repeated until the assigned weights "look" optimal. Unfortunately, this process can be tedious, time consuming, and error prone, especially for a relatively large corpus of searchable items (e.g., millions of items or more) that undergo frequent changes or edits, or where there the ranking function has more than a few weighted components.

Thus, there is a need for techniques for more efficiently determining optimal weights to use in a ranking function. The present disclosure provides techniques that address this and other needs.

Figure 1:
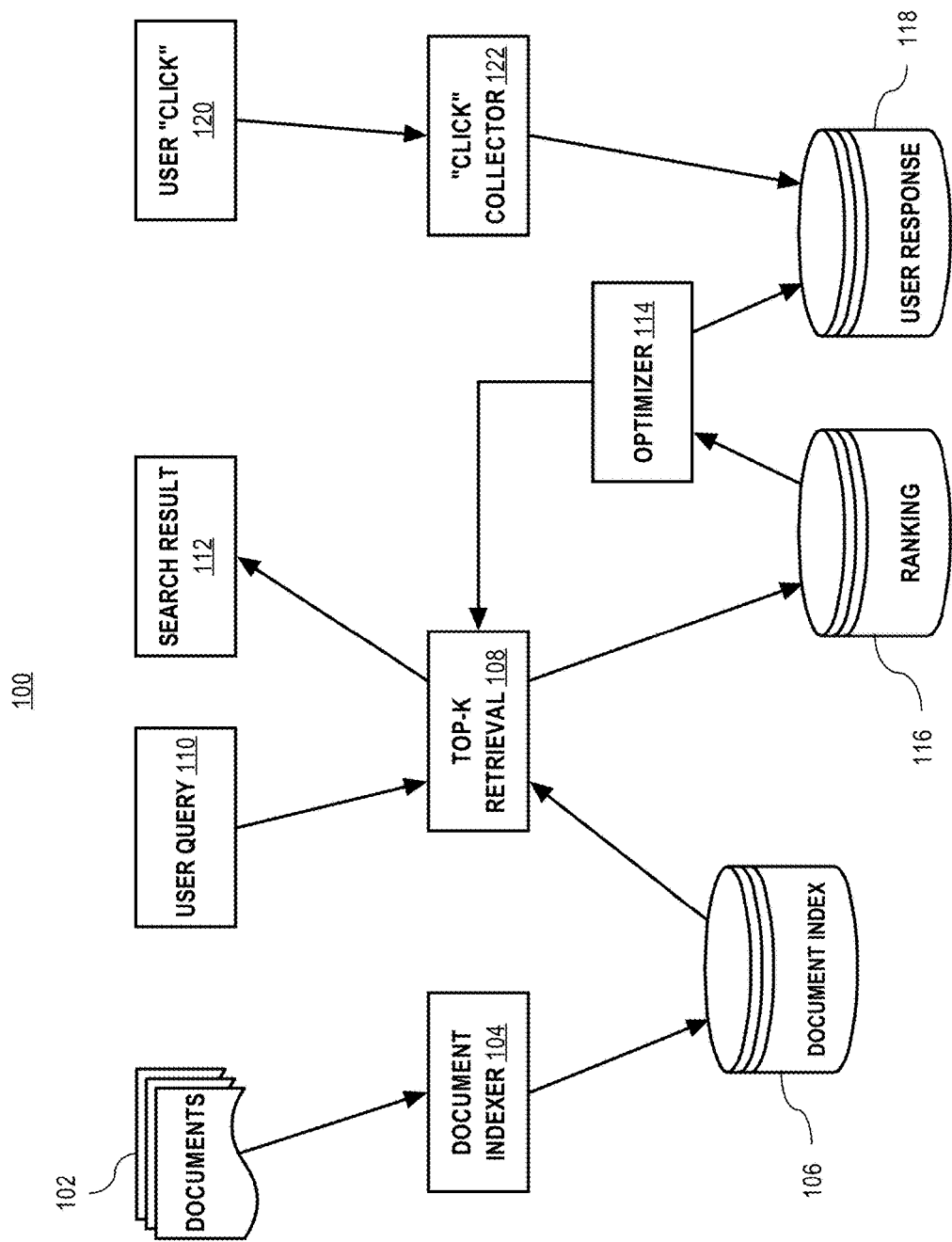
FIG. 1 is a block diagram of a computing environment according to aspects of the present disclosure.

While the present technology is amenable to various modifications and alternative forms, specific embodiments are shown by way of example in the drawings and are described in detail. It should be understood, however, that the drawings and detailed description are not intended to limit the present technology to the particular form disclosed. The intention is to cover all modifications, equivalents, and alternatives falling within the spirit and scope of the present technology as defined by the appended claims.

DETAILED DESCRIPTION

In the following description, for the purposes of explanation, numerous specific details are set forth in order to provide a thorough understanding of the present technology. It will be apparent, however, that the present technology may be practiced without these specific details. In other instances, well-known structures and devices are shown in block diagram form in order to avoid unnecessarily obscuring the present technology.

General Overview

Techniques for optimizing the relevance of search results in a text-based information retrieval computer system are disclosed. According to some aspects of the present disclosure, the techniques include determining a more optimal set of "boost factors" (e.g., weights) for use in a ranking function. The determined set of boost factors may be more optimal than a set of boost factors that the ranking function is currently configured to use in that the ranking function configured with the more optimal set of boost factors produces more accurate ranking scores, where ranking scores reflect an expected relevance of matching documents. In some implementations, the ranking scores also indicate a set of snippet fields to show in the search results. In some implementations, a set of snippet fields can be selected based on separate snippet scores.

According to some implementations, the determination of the more optimal set of boost factors is based on historical search result ranking scores and user responses to the historical search results. More specifically, a ranking log and a user response log can be maintained. The ranking log can record individual field scores computed for search result documents matching corresponding search queries. The recorded individual field scores may be weighted components of the ranking function to which a current set of boost factors are applied. The ranking log can also record the search result ranking order of the matching documents.

The user response log can record how users interact with the search results. These search results can be presented as summaries of the matching documents, which can include snippet fields including: content from the matching document; privacy data for the matching document; indicators about storage location or organization identifiers for the matching document; user view, edit, or comment history on the matching document; or any combination thereof. Search results can be presented in an order defined by corresponding ranking scores. According to some implementations, the user response log records which matching documents received a "long click" (e.g. a user remaining on a selected content item for above a threshold duration) indicating a "good" relevancy, which documents received a "short click" (e.g. a user remaining on a selected content item for below the threshold duration) indicating "fair" relevancy, and which documents were skipped indicating "bad" relevancy.

Based on information in the user response log, relevance labels or scores such as "good," "fair," "bad," and "unknown" can be assigned to the matching documents returned in the search results. From the assigned relevance labels, ground truth rankings can be determined for the matching documents. An optimization algorithm can then be executed to find a set of boost factors that minimizes a cost function. The cost function may be based on a metric that compares (i) rankings of the documents according to ranking scores computed by the ranking function using a given set of boost factors to (ii) the ground truth rankings of the documents. According to some aspects of the present disclosure, the metric is a pairwise metric based on the number of inversions between (i) the rankings computed using the given set of boost factors and (ii) the ground truth rankings. For example, the number of inversions may be measured by a Kendal tau distance or other metric suitable for measuring the difference or distance between two ranked lists (e.g., Spearman's footrule).

The ranking function may then be configured to compute ranking scores for documents matching user queries using a new set of boost factors determined by the optimization algorithm to minimize the cost function. The process of determining a new set of boost factors to use in the ranking function may be repeated periodically to account for document changes (additions, deletions, and/or modifications) within the document corpus that occur over time.

In some embodiments, a machine learning approach is used to rank documents matching a query and/or to select snippet field types for snippets of the matching documents presented in a search result to the query.

In the description below, an example information retrieval system is used for illustrative purposes. It will be appreciated that the various features and techniques described herein could, with appropriate modifications, be used with alternative information retrieval systems (e.g., Apache Solr, Apache Sphinx, an Internet search engine, or other search engine).

Computing Environment

FIG. 1 illustrates an environment 100 in which aspects of the present disclosure may be implemented. Environment 100 can be a distributed computing system comprising a number of a computing devices (not shown) interconnected by one or more communications networks (not shown).

The communication networks may include one or more of: the Internet, other wide area networks, local area networks, metropolitan area networks, wireless networks, cellular networks, and so on.

The computing devices may include "server" computing devices operated by an online service provider and "personal" computing devices operated by users. In some implementations, users can hold user accounts with the online service provider. The server computing devices may be co-located (racked) in a data center or other computer hosting facility. The personal computing devices may include stationary and portable computing devices such as, for example, desktop computers, workstation computers, laptop computers, tablet computers, smart phones, and so on. A computing device, whether server-type or personal-type, may have hardware components like one or more of those of example computer system 800 described below with respect to FIG. 8.

In an example embodiment, the online service provider is a large-scale online service provider that hosts millions of user accounts or more and services requests from a corresponding number of personal computing devices. However, it will be appreciated that various techniques and features disclosed herein could, with appropriate modifications according to the requirements of the particular implementation at hand, be implemented on a smaller scale (e.g., with tens, hundreds, or thousands of accounts or less).

In FIG. 1, the environment 100 includes a document indexing computer system (indexer) 104, a document index 106, a top-k retrieval computer system 108, a boost factor optimizer computer system (optimizer) 114, a ranking log 116, a user response log 118, and a user click collector system (click collector) 122. These and other system components are discussed in turn below.

Indexer and Document Index

The indexer 104 can receive and parse a set of documents 102 to produce tokens that can be stored in document index 106 to enable fast information retrieval. In certain embodiments, the set of documents 102 indexed by indexer 104 may be associated with one or more user accounts held by user(s) with the online service provider. For example, the set of documents 102 indexed by indexer 104 may be those associated with a single user account, those associated with a team or group of user accounts, or those associated with all user accounts. Thus, document index 106 may be user-specific, team or group specific, or a global index for all user accounts.

A document may be considered associated with a user account if the user account has some level of access (e.g., view and/or edit access) to the document by virtue of the association that the user account would not have if the association did not exist. In other words, the association between the user account and the document provides affirmative permission for some level of access to the document by the user account where the level of access is specified by the association (e.g., in an access control list). The association may be established, for example, by an access control list stored in a database (not shown) and associated directly or indirectly with the document and the user account. Further, even though the set of documents 102 indexed by indexer 104 may be those associated with a single user account, one or more documents of the set of documents 102 in this case may be associated with one or more additional user accounts. For example, one or more documents may be shared among (accessible by) multiple user accounts.

Parsing Documents

Parsing of a document by indexer 104 may include parsing the document's contents and/or the document's metadata. Parsing of a document by indexer 104 may occur at various times including after a new document is added to the set of documents 102 and/or after an existing document in the set of documents 102 is modified (edited). In the case of a modified (edited) document, parsing may be limited to just the portion of the document's contents and/or the document's metadata affected by the modification (edit) or modifications (edits).

Parsing a document by indexer 104 may include tokenization where indexer 104 identifies sequences of characters (tokens) in the document's contents and/or the document's metadata. Indexer 104 may then store the extracted tokens in index 106 in association with the document from which the tokens were extracted. For example, the index 106 may be structured as an inverted index that maps tokens to identifiers of documents that contain the tokens. It will be appreciated that various techniques and features disclosed herein could, with appropriate modifications according to the requirements of the particular implementation at hand, be implemented in an environment where document index 106 is structured in a manner other than as an inverted index (e.g., as a suffix tree, N-gram index, or document-term matrix).

Documents

Techniques described herein involve ranking scores computed for documents 102 that match queries 110. Various aspects of the documents may be used in computing ranking scores for the documents. The two highest level aspects of a document 102 that may be used for computing a ranking score are the document's contents and the document's metadata. A document 102 may also be indexed, in document index 106, by tokens extracted from the document's contents and/or the document's metadata.

Document Content Type

A document's contents may conform to a content type. The techniques described herein are not limited to any particular content type or set of content types. A document 102 may belong to a general content type category such as, for example, text (e.g., a textual message, plain unformatted text, enriched text, word processing text, rich text, etc.), multipart (e.g., data consisting of multiple parts of independent data types), message (e.g., an encapsulated message, an RFC 822 conformant message, etc.), image (e.g., image data that requires a display device to view the information, JPEG, GIF, etc.), audio (e.g., audio data that requires an audio output device such as a speaker or a telephone to "display" the information), video (e.g., video data that requires the capability to display moving images), or application (e.g., some other kind of data, binary data in a standardized, proprietary, or application-specific format, etc.)

Within a general content type category, a document contents may have a specific digital content type. For example, the contents of a document 102 in the application content type category may be an ADOBE PDF content type or a MICROSOFT WORD content type, as just two examples. However, a document 102 may belong to other general content type categories and a document's contents may have other specific content types. Accordingly, unless otherwise apparent in context, the term "document" as used herein and in the appended claims is not limited to any particular general content type category or any particular specific content type.

Document Metadata

A document's metadata may contain information about various aspects of the document. A document's metadata can be formatted as text, but there is no requirement of the techniques described herein that a document's metadata be formatted as text. Non-limiting examples of a document's metadata may include a title of the document, a file name for the document, a relative or absolute file path for the document, a team name for the document, a creator or owner of the document, an editor of the document, an invitee to the document, an inviter for the document, a sharer of the document, a recipient of the document, or a commenter on the document.

Document Title

A title for a document 102 may include an identifier (e.g., a name) of the document. The title of the document in the document's metadata may be the same or different from a title for the document in the document's contents.

Document File Name

A file name for a document 102 may include an identifier of a file in a file system that contains the document's contents. The file may also contain some or all of the document's metadata. Alternatively, some or all of the document's metadata may be stored in separate container(s). The file system can be a file system for organizing and tracking data stored on storage media or a file system based thereon.

Document File Path

A file path for a document 102 may include an identifier of a relative or absolute path in a file system to a file system directory or folder that contains the document.

Document Team Name

A team name for a document 102 may include an identifier of a set of user accounts that have some level of access with respect to the document (e.g., permission to view, preview, read, edit, and/or share the document) by virtue of the user account's membership in the user account set.

Document Creator

A creator of a document 102 may include an identifier of a user account that created an initial version of the document. An owner of a document 102 may include an identifier of a primary user account to which the document 102 is assigned. In various implementations, the owner of a document 102 can be the creator of the document 102 or can be a different user account.

Document Editor

An editor of a document 102 may include an identifier of a user account that edited a version of the document. A document 102 may have multiple editors.

Document Invitee

An invitee for a document 102 may include an identifier of a user account that was invited to the document by another user account. A document 102 may have multiple invitees. Upon accepting an invitation to the document, the invitee user account may be added to a group of user accounts that have some level of access to the document and the list of user accounts in this group can be the invitees for the document.

Document Inviter

An inviter for the document 102 may include an identifier of a user account that invited another user account to the document 102. A document 102 may have multiple inviters. In some implementations, each inviter associated with a document 102 can be correlated with one or more invitees that inviter has invited to the document.

Document Sharer

A sharer for a document 102 may include an identifier of a user account that shared the document with another user account. In some implementations, a document 102 may be shared with a user account via a unique link (e.g., a unique URL) to the document. The recipient of the link may use the link to access the document according to permissions associated with the link. Depending on permissions associated with the document, the sharer user account may or may not be a member of a group of user accounts that has some level of access to the document, yet the sharer user account may still have permission to share a link to the document. Likewise, depending on permissions associated with the document, the recipient user account may or may not be a member of the group, yet the recipient user account may still have permission to access the document via the link according to permissions associated with the link. A document 102 may have multiple sharers.

Document Recipient

A recipient for a document 102 may include an identifier of a user account with which a link to the document was shared by a sharer user. The recipient user may use the link to access the document according to permissions associated with the link. A document 102 may have multiple recipients.

While in some embodiments sharing a document by a user account involves generating a unique link (e.g., a unique URL) to the document and sharing the link with one or more other user accounts (e.g., via an e-mail or text message), a document may be shared by a user account with other user accounts by mechanisms in addition to or instead of a unique link. For example, an inviter to a document 102 as described above may also be considered a sharer of the document and an invitee to a document 102 as described above may also be considered a recipient of the document.

Document Commenter

A commenter on a document 102 may include an identifier of a user account that has commented on the document using a commenting application that allows a user account with access to the commenting application to engage in a threaded discussion about the document.

Other Document Metdata

A document's metadata may also contain information about or derived from various recorded aspects of the history of the document. Such information may include, but is not limited to, metrics computed from the viewing, editing, sharing, or commenting history of the document. Such metrics may include, but are not limited to, a number of times and/or timestamps that user accounts have viewed (view count), edited (edit count), commented on (comment count), or shared (share count) the document.

Other Document Features

A document 102 may comprise a text string and an associated set of attributes. The text string may be a part or all of the document's contents. The associated set of attributes may be part of the document's contents, part of the document's metadata, or some of the attributes may be part of the document's contents and some part of the documents' metadata. Each attribute may be associated with a character or a range one or more characters in the text string to which the attribute applies or describes. The association between an attribute and a character or a range of one or more characters may be established by a numerical index or numerical indices into the text string that identify the character or range of characters with which the attribute is associated. An attribute may be a key/value pair, identified by the key, where no two attributes that apply to a given character of the text string have the same key. Attributes associated with the text string may be processed in an application-specific manner. For example, a range of characters in the text string may be associated with an attribute that indicates that the characters are to be presented by a word processing application in a bold typeface.

A document 102 may be stored as a sequence of change sets. In this context, a change set represents an edit to a particular version of a document 102. When applied to a document representation, a change set can insert and delete characters and apply attributes to ranges of characters. For example, a particular change set might represent the edit "insert the lowercase character 'd' at position 2 in the text string." If the particular change set is applied to a document representation having the text string "abc\n", then the resulting document representation would have the text string "adbc\n". A document 102 comprising a text string and a set of associated attributes may thus be formed by applying a sequence of change sets to an initial document representation. The initial document representation may be a document template or another document 102, for example.

A document's contents may be stored in various different types of data containers. For example, a document's contents may be stored in a file system file container, in a database, as one or more blocks, or as a base version and a series of any number of changes to the base version. Further, a document 102 may be stored by a single computing device or portions of the document 102 may be stored by different computing devices in a distributed file system. Some or all of the document's metadata may be stored in the same data container(s) as the document's contents. For example, some or all of the document's metadata may be stored in a header of a file system file container that also contains the document's contents. However, some or all of a document's metadata may be stored separately from the document's contents. For example, some or all of a document's metadata may be stored in one or more databases while the document's contents are stored in a file system file container and/or in one or more blocks in a distributed file system.

A document 102 may be configured for unidirectional or bidirectional asynchronous synchronization. In the unidirectional case, changes to a document originating at a user's personal computing device are replicated to one or more other computing devices where the replicated changes are applied to copies of the document stored at those other computing devices. In the case of bidirectional synchronization, changes to a document originating at a particular user's personal computing device are replicated to one or more other computing devices where the replicated changes are applied to copies of the document stored at those other computing device as in the case of unidirectional synchronization. In addition, with bidirectional synchronization, changes to the document originating at the other computing devices are replicated to the particular user's personal computing device where the replicated changes are applied to a copy of the document stored at the particular user's personal computing device.

When document changes are replicated between personal computing devices, the changes may be replicated through an intermediary server system operated by the online service provider that stores and forwards the changes. However, it is also possible to replicate document changes between personal computing devices in a peer-to-peer fashion. In a peer-to-peer scenario, the intermediary server system may still provide metadata to personal computing devices for facilitating peer-to-peer replication of document changes even though the document changes themselves are not stored and forwarded by the intermediary server system. Further, because changes can be (asynchronously) replicated, there may be a period of time where copies of the document at different computing devices are not identical.

In this description, reference to a change to a document 102 or a document change includes creating a new document, removing or deleting an existing document, and/or modifying (editing) an existing document.

While in some embodiments a search result returned in response to a query may be limited to documents as described above, a search result can include other types of "documents" in addition to or instead of documents as described above. For example, a "document" as used herein can refer to, but is not limited to referring to, an individual content item, a collection of content items (e.g., a folder), or logical organizational object for collecting or grouping content items (e.g. a category label, tag, or project identifier common to or associated with a set of content items by which the set of content items may be collected or grouped together.)

Presence Information

In some embodiments, a document's metadata includes presence information about the document. The presence information may specify whether the document is currently open at a personal computing device. The presence information may also indicate which user account or user accounts currently have the document open at their personal computing device(s).

A document 102 may be considered open at a personal computing device under a variety of different circumstances. In one circumstance, a document 102 is considered open if it is displayed or viewable on a display of a user's personal computing device. For example, the document's contents or a portion thereof may be displayed within a web browser window on the display. In another circumstance, a document 102 is considered open if it is available for viewing and editing (modification) at a user's personal computing device. For example, the web browser window may display the document's contents or a portion thereof in an editing mode that allows the user to modify (edit) the document's contents.

Presence information for documents may be maintained at server computing device(s) of the online service provider. For example, presence information for documents may be maintained in a distributed memory database or distributed in-memory key-value datastore (e.g., memcached) that allows for fast retrieval and update of presence information for documents.

When a document 102 is opened at personal computing device by an application (e.g., a web browser application), an "open" signal may be sent (e.g., in one or more network packets) by the application to a server of the online service provider. Upon receiving the open signal, the server-side presence information for the document may be updated to specify that the document is now open. Alternatively, the server-side presence information for the document may be updated to specify that the document is open when the document's contents or a portion thereof are sent by a server to a personal computing device for viewing or editing at the personal computing device. In this case, it may not be necessary for the application to send an open signal from the personal computing device back to a server. When the document is closed at the personal computing device, a "closed" signal may be sent by the application to the server. Upon receiving the closed signal, the presence information for the document may again be updated to specify the document is now closed. As indicated, sending of the open signal may correspond to the document's contents or a portion thereof being displayed by an application at the user's personal computing device for viewing or editing by the user. Sending of the closed signal may correspond to the application no longer displaying the document's contents. For example, where the application is a web browser application, the opened signal may be sent when the web browser application displays a document's contents or a portion thereof in a web browser window. The closed signal may be sent when the web browser window is closed or otherwise no longer displays the document's contents.

The presence information maintained for a document at a server may include various information about the open/closed status of the document including whether the document is or is not currently open, the time the document was last opened, the time the document was last closed, the number of user accounts that currently have the document open, and/or the identifier(s) of the user account(s) that currently have the document open.

Top-K Retrieval System

The top-k retrieval system 108 includes one or more server computing devices for receiving queries 110, e.g., from users' personal computing devices, and for sending search results 112 to the users' devices. For example, these server computing devices may be web servers configured to communicate with the users' personal computing devices via the Hyper Text Transfer Protocol, or a cryptographically secured variant thereof (e.g., HTTPS). In this case, the web servers may receive the queries 110 in HTTP requests from the personal computing devices and send results 112 to the personal computing devices in HTTP responses to the HTTP requests. Requests/responses can be received/sent by top-k retrieval system 108 through other protocols, e.g., protocols supported by AJAX callbacks.

A user may submit a query 110 to top-k retrieval system 108 from the user's personal computing device. A query 110 may be composed of one or more keywords (query terms) that the user expects to be contained in documents that the user is interested in. Query term containment can be within a document's contents and/or a document's metadata by which the document is indexed in document index 106. In some implementations, queries can contain other search criteria, such as file path, logical organization restrictions to search within, or values paired with metadata types to restrict searches to. For example, queries can be limited to documents owned by particular user accounts, documents shared with the current user by specified other users, documents created or edited within a specified timeframe, etc.

The top-k retrieval system 108 can also include one or more server computing devices for identifying documents in document index 106 that match the queries 110. A document 102 may be considered by top-k retrieval system to match a query 110 if, according to the document index 106, all or a threshold amount of the query terms are contained in the document. A document may contain a query term in its contents and/or its metadata. Identification of matching documents by top-k-retrieval system 108 may be performed, for example, by intersecting document posting lists associated with query terms in the document index 106. However, it will be appreciated that various techniques and features disclosed herein could, with appropriate modifications according to the requirements of the particular implementation at hand, be compatible with other techniques for identifying documents matching queries that are appropriate and efficient for the structure or type of document index 106.

The top-k retrieval system 108 may compute ranking scores for documents matching a query 110 received from a querying user's personal computing device. The ranking scores may be computed according to a ranking function, discussed below. The top-k matching documents according to their ranking scores may be returned by the top-k retrieval system 108 to the querying user's personal computing device in a results 112. The results 112 may be displayed in a web page, for example. The results 112, when displayed on a display of the user's personal computing device, may present the top-k matching documents in order of their ranking scores (e.g., from top to bottom).

Result Content

Figure 2:
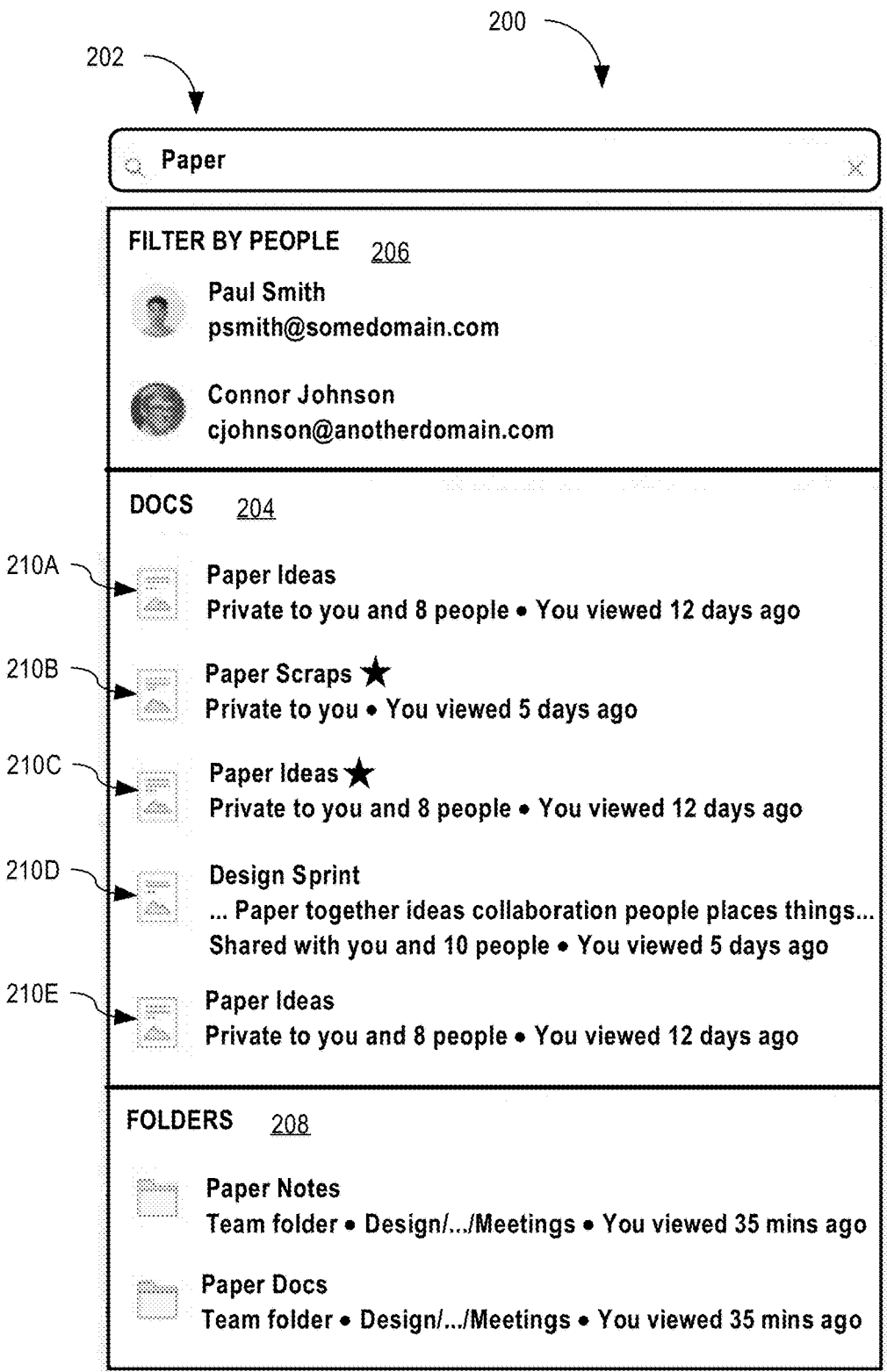
FIG. 2 illustrates result content according to aspects of the present disclosure.

FIG. 2 illustrates example results displayed as results content 200 according to some aspects of the present technology. The results content 200 may be displayed on a display of a user's personal computing device from which a query 110 is received. For example, results content 200 may be displayed as a web page as part of a web page or as or in another graphical user interface.

In FIG. 2, the results content 200 shows the user's inputted query string 202. In this example, the query string 202 consists of just one query term: "Paper". However, a query string may consist of more than one query term or may specify other search criteria such as edit date constraints, owner identification, or other specifics which can be matched against document metadata.

The example results content 200 provides three different types of search results: document results 204, people results 206, and folder results 208. In some implementations, additional types of results can be provided, such as identifiers or labels used to classify or organize documents. In this example, document results 204 include the top-5 documents matching the query 202 listed from top to bottom in the results content 200 in order of decreasing relevance according to their ranking scores. Each of the top-5 matching documents is represented by a summary or "snippet" 210 of that document. Each snippet presents various relevant information about the corresponding document to aid the user in determining whether the corresponding document is a document that the user is interested in or is looking for. In FIG. 2, snippet 210A represents the highest or best ranked matching document, snippet 210B represents the next highest or next best ranked matching document, and so on down to snippet 210E which represents the lowest ranked matching document of the top-five matching documents presented in the results content 200.

Snippet Fields

A snippet (e.g., 210A) presented in results content (e.g., 200) may include one or more snippet fields. The snippet fields may indicate various aspects about the corresponding document that aid the querying user in deciding whether the document is particularly relevant or not particularly relevant. For example, snippet 210A provides a title for the corresponding matching document ("Paper Ideas"), indicates that the document is private to a group of nine users that includes the querying user, and indicates that the document was viewed by the querying user twelve days ago. The querying viewer may view these snippet fields when determining whether to select ("click on") the snippet 210A, which may be interactive and respond to user input (e.g., point device input or touch gesture). A snippet field may be generated based on the corresponding document's contents and/or metadata. Various different types of potential snippet fields will now be described.

Privacy Snippet Field

When the querying user is authenticated into a user account, a snippet (e.g., 210A) of a matching document presented in results content (e.g., 200) may include a privacy snippet field. The privacy snippet field may convey information about which user accounts have access to the document. From the privacy snippet, the querying user can tell whether the document is accessible to only a group of user accounts that includes the querying user account.

For example, snippet 210A has a privacy snippet field of "Private to you and 8 people," which indicates to the querying user that only the querying user account and 8 other user accounts have access to the document represented by snippet 210A.

A search result snippet for a matching document is not required to have a privacy snippet field. For example, a snippet may not have a privacy snippet field if the represented document is accessible to all user accounts.

When top-k retrieval system 108 generates result content for a query, a privacy snippet may be generated for a matching document based on information contained in the metadata of the document. For example, the metadata information may specify which user accounts have access to the document, a number of user accounts that have access to the document, and/or whether the querying user has access to the document.

In some implementations, the snippet fields presented in a given snippet may be selected according to one or more snippet field selection rules. A different set of snippet fields may be selected for different snippets depending on the characteristics of the document represented by the snippet. For example, returning to a previous example, a snippet may or may not include a privacy snippet field depending on whether or not the document represented by the snippet is accessible only to a closed group of user accounts that includes the querying user account. In the example of FIG. 2, snippets 210A, 210B, 210C, and 210E each include a privacy snippet field but snippet 210D does not.

In some implementations, a machine learning approach is used to determine a snippet presentation scheme as described in greater detail below. It will be appreciated that a snippet selection scheme based on selection rules is not incompatible with a machine learning implementation. Nonetheless, in some implementations, only snippet selection rules are used to select a snippet presentation scheme for snippets and machine learning is not used. In other implementations, only machine learning is used and snippet selection rules are not used. Alternatively, a hybrid approach may be employed. For example, snippet selection rules may be used to select a candidate set of snippet fields. Then, machine learning may be used to rank the candidate set of snippet fields and select the top-N ranked candidate snippet fields for presentation in a snippet.

According to some embodiments, one or more of the following snippet fields are available for presentation in a snippet of a document in results content:

Privacy Snippet Field
Path Snippet Field
Truncated Path Snippet Field
Path Tail Snippet Field
Shared With Snippet Field
Last Viewed Snippet Field
Edited Snippet Field
Commented Snippet Field
Doc Copy Snippet Field
Presence Snippet Field
Logical Organization Snippet Field As mentioned above, the privacy snippet field may be selected for a given snippet if the document represented by the snippet is accessible only to a specific group of user accounts that includes the querying user account.

Path Snippet Field

A path snippet field of a snippet may display a full or relative path to a folder that contains the document represented by the snippet. An example of a path snippet field is "Teams Pillar/Working Groups/Organize Working Groups/Search." Here, the backslash character "/" is used to separate the names of folders along the path to the "Search" folder that contains the document represented by the snippet. A path snippet field may be selected for display in a snippet based on the number of characters in the path being below a threshold number. The threshold number may be based on the size of the user's display screen so as to prevent the path snippet field from consuming too much screen real estate.

When top-k retrieval system 108 generates result content for a query, a path snippet field may be generated for a matching document based on information contained in the metadata of the document. For example, a path snippet field may be generated based on a file name and/or a file path of the document's metadata.

Truncated Path Snippet Field

A truncated path snippet field of a snippet may display a part of a path, such as the first and last folders of a full or relative path to a folder that contains the document represented by the snippet. An example of a truncated path snippet field is "Teams Pillar/ . . . /Search." Here, only the name of the first folder in the path and the name of the last folder in the path are displayed. The intermediate folders are represented by the ellipsis " . . . ". A truncated path snippet field may be selected for display in a snippet if the number of characters of the path snippet field is not below the threshold number but the number of characters of the truncated path snippet field is below the threshold number.

When top-k retrieval system 108 generates result content for a query, a path snippet field may be generated for a matching document based on information contained in the metadata of the document. For example, a path snippet field may be generated based on a file name and/or a file path of the document's metadata.

Path Tail Snippet Field

A path tail snippet field of a snippet may display the last folder of a full or relative path to a folder that contains the document represented by the snippet. As an example of a path tail snippet field is " . . . /Search." Here, only the name of the last folder in the path is displayed. The folders earlier in the path are represented by the ellipsis " . . . ". As another example of a path tail snippet field is "Search." Here, only the name of the last folder in the path is displayed. A path tail snippet field of a snippet may be selected for display in a snippet if the number of characters of the path snippet field and the number of characters of the truncated path snippet field are not below the threshold number but the number of characters of the path tail snippet field is below the threshold number.

When top-k retrieval system 108 generates result content for a query, a path tail snippet field may be generated for a matching document based on information contained in the metadata of the document. For example, a path snippet field may be generated based on a file name and/or a file path of the document's metadata.

Shared with Snippet Field

A shared with snippet field of a snippet may provide information about which user accounts or the number of user accounts among which the document is shared. According to some embodiments, if the querying user account has shared the document with exactly one other user account, then the shared with snippet field may be of the form: "You shared with [X] [Y]." Here, [X] would be replaced with an identifier of the user account with which the querying user account shared the document. For example, [X] could be the shared with user's full name (e.g., "Pat"), first name and first initial of last name (e.g., "Pat P."), or the user's e-mail address (e.g., "pat@somecompany.com"). [Y] would be replaced with a description of the time when the document was shared. For example, if the querying user account shared the document two days ago then [Y] could be "2 days ago." In this example, the shared with snippet field could be: "You shared with Pat P. 2 days ago". As an alternative, a shared with snippet field could be of the form "You shared with [X] users" where [X] in this case is the number of user accounts with which the querying user shared the document. As yet another alternative, the target of the sharing can be omitted from a shared with snippet field as in: "You shared this document." Here, the shared with snippet field does not specify a number of user accounts or a particular user account with which the querying user shared the document.

According to some embodiments, if the document is shared with just the querying user account by another user, then the shared with snippet field may be of the form: [X] shared with you [Y] two days ago." Here, [X] and [Y] are like as previously discussed except that [X] refers to the sharing user account instead of the shared with user account as in the previous example.

While in some implementations a shared with snippet field includes a timeframe for the sharing, a shared with snippet field does not include a timeframe in other implementations. For example, the shared with snippet field: "You shared with Pat P. 2 days ago" may instead be presented as "You shared with Pat. P." Similarly, the shared with snippet field: "Pat P. shared with you 2 days ago" could be presented as "Pat P. shared with you."

According to some embodiments, if the document is shared, by one or more user accounts other than the querying user account, with the querying user and at least one other user account, then the shared with snippet field may be of the form: "Shared with you and [Z] other people/person." Here, [Z] refers to the number of other user accounts in addition to the querying user account with which the document is shared. An example of this type of shared with snippet field is in snippet 210D of FIG. 2.

When top-k retrieval system 108 generates result content for a query, a shared with snippet field may be generated for a matching document based on information contained in the metadata of the document. For example, a shared with snippet field may be generated based on invitee, inviter, sharer, and/or recipient information of the document's metadata.

Last Viewed Snippet Field

A last viewed snippet field of a snippet may provide information about when the querying user account or another user account lasted viewed the document represented by the snippet. Examples of this type of snippet field can be found in snippets 210A, 210B, 210C, 210D, and 210E of FIG. 2.

When top-k retrieval system 108 generates result content for a query, a last viewed snippet field may be generated for a matching document based on information contained in the metadata of the document. For example, a last viewed snippet field may be generated based on the viewing history of the document as recorded as part of the document's metadata.

Edited Snippet Field

An edited snippet field of a snippet may provide information about when the querying user account or another user account last edited the document represented by the snippet. Examples of this type of snippet field include: "You edited 2 days ago" or "Pat P. edited 2 days ago."

When top-k retrieval system 108 generates result content for a query, an edited snippet field may be generated for a matching document based on information contained in the metadata of the document. For example, an edited snippet field may be generated based on a the editing history of the document as recorded as part of the documents' metadata.

Commented Snippet Field

A commented snippet field of a snippet may provide information about when the querying user account or another user account last commented on the document represented by the snippet. Examples of this type of snippet field include: "You commented 2 days ago" or "Pat P. commented 2 days ago."

When top-k retrieval system 108 generates result content for a query, a commented snippet field may be generated for a matching document based on information contained in the metadata of the document. For example, a commented snippet field may be generated based on the commenting history of the document as recorded as part of the document's metadata.

Doc Copy Snippet Field

A doc copy snippet field of a snippet may include a relevant portion of the contents of the document represented by the snippet. According to some embodiments, a doc copy snippet field is selected for display as part of the snippet if the query terms do not match the title of the document. An example of a doc copy snippet field is snippet 210D in FIG. 2. Here, the query term "Paper" does not match a term of the document title "Design Sprint." However, a relevant portion of the document's contents that does contain the query term is provided as the doc copy snippet field " . . . Paper together ideas collaboration people places things . . . ". By including the doc copy snippet field, the querying user is aided in determining why the document was included in the top-5 search results even though the query term does not match the title of the document.

When top-k retrieval system 108 generates result content for a query, a doc copy snippet field may be generated for a matching document based on the document's contents. For example, a doc copy snippet field may be generated based on the document's contents according to a doc copy snippet generation algorithm. For example, the doc copy snippet generation algorithm may extract a set of one or more sentences and/or phases from the document's contents determined to be particularly relevant to the query (e.g., containing the query keywords) for presentation as a doc copy snippet field. In addition, or alternatively, the doc copy snippet generation algorithm may apply sentence compression techniques to one or more lexical elements (e.g., phrases, sentences, or paragraphs) of the document's contents to produce a compressed lexical element (e.g., a sentence) that summarizes the original lexical elements while still being grammatical and conveying the gist of the original lexical elements.

Presence Snippet Field

A presence snippet field of a snippet may provide information about another user account that currently has the document represented by the snippet open according to presence information associated with the document. Examples of this type of snippet field include: "Pat P. is currently viewing" or "Pat P. is currently editing".

When top-k retrieval system 108 generates result content for a query, a path snippet field may be generated for a matching document based on information contained in the metadata of the document. For example, a path snippet field may be generated based on a file name and/or a file path of the document's metadata.

Logical Organization Snippet Field

A logical organization snippet field of a snippet may specify an identifier of a logical organization to which the document represented by the snippet belongs. The logical organization can be a tag, group, team, project, folder, or other logical organization to which the document belongs. For example, a document that belongs to a "Skunk Works" project could have a logical organization snippet field of "Skunk Words." The logical organization could also be a logical grouping to which the document belongs. For example, if the document belongs to the querying user's favorite documents, then the logical organization snippet field may indicate this. For example, in result contents 200 of FIG. 2, the snippets 210B and 210B include a star to indicate that the corresponding documents are among the querying user's favorites. This example also illustrates that a snippet field is not limited to being text and may include other types of content in addition to or instead of text such as a static or animated graphic, image, or icon.

Parameterized Ranking Function

A ranking score for a document 102 matching a query may be computed by the top-k retrieval system 108 according to a parameterized ranking function. Various different ranking functions may be used by the top-k retrieval system 108 to compute the ranking score and the techniques described herein are not limited to any particular ranking function.

In other embodiments, a document 102 matching a query is ranked according to a discriminative training approach. This approach is discussed in greater detail below. Generally, however, the discriminative training approach involves an automatic learning process based on training data. The training data may be based on information in the ranking log 116 and the user response log 118. For example, the training data may comprise a set of queries and associated documents represented by feature vectors, and corresponding relevance judgments generated based on information in the user response log 118. A learning algorithm may then by employed to learn a way of combing the features in the form of a ranking model, such that the output of the ranking model can predict a ground truth label in the training data as accurately as possible, in terms of a loss function. When the top-k retrieval system 108 receives a new query 110, the learned ranking model is applied to sort the top-k matching documents according to their relevance to the query, and return a corresponding ranked list in the search result 112 to the query.

Returning now to discussion of ranking functions, in some implementations, a ranking function used to compute the ranking score may use weights or "boost factors" to determine how much emphasis to place on matches between search terms and various portions of a document or document metadata when computing a rank for a document in the search results. In some implementations, a ranking function can have a query-dependent component and a query-independent component. For example, according to some implementations, the following ranking function may be used to compute the ranking score for the document.

$$S_{overall} = S_{query-dependent} S_{query-independent}$$

According to the above ranking function, the overall ranking score for the document is the product of a query-dependent score for the document and a query-independent score for the document.

Query-Dependent Score

The query-dependent score may be computed as a function of the query terms in a given query. According to some embodiments, the query-dependent score is the sum of the maximum weighted score for each text field for each term in the query. Specifically, the following function may be used to compute the query-dependent score for the document:

$$S_{query-dependent} = \sum_{t \in T} \max_{f \in F_q} w_f s_{f,t}$$

Here, the variable T represents the set of one or more query terms in a given query. The variable $F_q$ represents the set of text fields that are queried. No particular set of text fields are required of the techniques described herein. The set of text fields may vary depending on a variety of factors include the structure, type, and/or content of the documents queried. In general, however, the set of text fields are text fields to which query terms can be matched.

A text field may be composed of text information from the document's contents and/or the document's metadata. According to some embodiments, the set of text fields $F_q$ consist of a title field and a contents field. The title field may comprise text of the document's title as specified by the document's metadata. The contents field may comprise the text of the document's contents. Other text fields are possible and the techniques are not limited to a title field and a contents field. For example, if the documents are e-mail messages, the set of text fields may include a header field, a subject field, and a body field, for example.

The variable $s_{f,t}$ represents a similarity score on the text field f for the query term t. The score may be generated according to a similarity algorithm. A variety of different similarity algorithms may be used and the techniques described herein are not limited to any particular similarity algorithm. For example, the similarity algorithm may be based on a TD/IDF similarity, a BM25 similarity, a divergence from randomness (DFR) similarity, a divergence from independent (DFI) similarity, an information based (IB) similarity, a LM Dirichlet similarity a LM Jelinek Mercer similarity, or other similarity model suitable for the requirements of the particular implementation at hand. Note that the similarity model may be per-text field such that different text fields may use different similarity models and hence different similarity algorithms to compute the similarity scores for those text fields. However, there is no requirement that this be the case and the same similarity model and the same similarity algorithm may be used to compute the similarity scores for all text fields.

No particular set of text fields are required of the techniques described herein. The set of text fields may vary depending on a variety of factors including the structure, type, and/or content of the documents queried. In general, however, the set of text fields are text fields to which query terms can be matched. A text field may be composed of text information from the document's contents and/or the document's metadata. According to some embodiments, the set of text fields $F_q$ consist of a title field and a contents field. The title field may comprise text of the document's title as specified by the document's metadata. The contents field may comprise the text of the document's contents. Other text fields are possible and the techniques are not limited to a title field and a contents field. For example, if the documents are e-mail messages, the set of text fields may include a header field, a subject field, and a body field, for example.

The variable $w_f$ represents a boost factor (weight) for the text field f. Boost factors may be determined according to techniques disclosed herein. Initially, however, text fields may be assigned initial boost factors. Then, after a number of queries have been processed and documents scored for relevance using the ranking function with the initial boost factors, the techniques disclosed herein may be used to determine updated boost factors for use in the ranking function. For example, an initial boost factor for the title field may be 2.0 and the initial boost factor for the contents field may be 1.0 to reflect that a match of a query term on the title of a document is believed to be more relevant than a match of a query term on the document's contents.

Query-Independent Score

Turning now to the query-independent score component ($S_{query-independent}$) of the ranking function, according to some embodiments, the query-independent score is the product of boosted (weighted) query-independent field scores. A query-independent field score may be one that can be computed for a document independent of a particular query that the document matches. For example, a query-independent field score may be computed based on the document's contents and/or the document's metadata irrespective of how well the query matches the document. In some implementations, the following function is used to compute the query-independent score for the document:

$$S_{query-independent} = \Pi_{f \in F_{nq}} w_f s_f$$

Here, the $F_{nq}$ represents a set of query-independent fields, $s_f$ represents the score for the query-independent field f, and $w_f$ is the boost (weight) assigned to the query-independent field f. A query-independent field may be a field for which a query-independent field scores is computed. Some example query-independent fields are provided below. No particular set of query-independent fields are required of the techniques described herein and the set of query-independent fields may vary from implementation to implementation according to the requirements of the particular implementation at hand.

According to some embodiments, two different types of query-independent field scores are used: Boolean and number. The score ($S_f$) of a Boolean-type query-independent field f depends on whether a condition associated with the query-independent field is true for the document being scored. If the field condition is true for the document, then the score if 1, otherwise the score is $$\frac{1}{w_f}.$$

Hence, the boosted (weighted) query-independent field score for a Boolean-type query-independent field f equals the boost factor $W_f$ for the field if the field condition is true for the document, or equals 1 otherwise. The score ($S_f$) of a number-type query-independent field f is a numerical value within a constrained range.

According to some embodiments, scores for all of the following query-independent fields are incorporated in the query-independent score ($S_{query-independent}$) for the document, or a subset or a superset of a subset:

| Query-independent Field f | Type | Example Initial Boost Factor $W_f$ | Example Field Score $S_f$ |
|---|---|---|---|
| View Count | Number | 1 | A numerical value in a constrained range (e.g., between 1.0 and 1.7) based on a number of times the document has recently been viewed (e.g., in the past week) and a total number of times the document has been viewed (e.g., |

| Query-independent Field f | Type | Example Initial Boost Factor $W_f$ | Example Field Score $S_f$ |
|---|---|---|---|
| | | | since the document was created). |
| Edit Count | Number | 1 | A numerical value in a constrained range based on a number of times the document has recently been edited and a total number of times the document has been edited. |
| Share Count | Number | 1 | A numerical value in a constrained range based on a number of times the document has recently been shared and a total number of times the document has shared. |
| Creator | Boolean | 1.6 | 1 if the querying user account is a creator of the document, otherwise $\frac{1}{w_f}$. |
| Editor | Boolean | 1.3 | 1 if the querying user account is an editor of the document otherwise $\frac{1}{w_f}$. |
| Invitee | Boolean | 1.3 | 1 if the querying user account is an invitee to the document, otherwise $\frac{1}{w_f}$. |
| Recipient | Boolean | 1.3 | 1 if the querying user account is a recipient user account of the document, otherwise $\frac{1}{w_f}$. |
| Presence | Boolean | 1.6 | 1 if at least one user account currently has the document open at the time of the query according to presence information associated with the document, otherwise $\frac{1}{w_f}$. |

In the above table, the names in the query-independent field column are used merely for reference within this description for the purpose of providing clear examples. The type column specifies whether the corresponding query-independent field is a Boolean-type query-independent field or a number-type query-independent field as described above. The example initial boost factors may be updated according to the techniques described herein.

Ranking Log

When the top-k retrieval system 108 processes a query 110, the top-k retrieval system 108 may add, to the ranking log 116, information about the returned search result 112. As described in greater detail below, information in the ranking log 116 may be used by the optimizer system 114 to update search result relevance.

Figure 3:
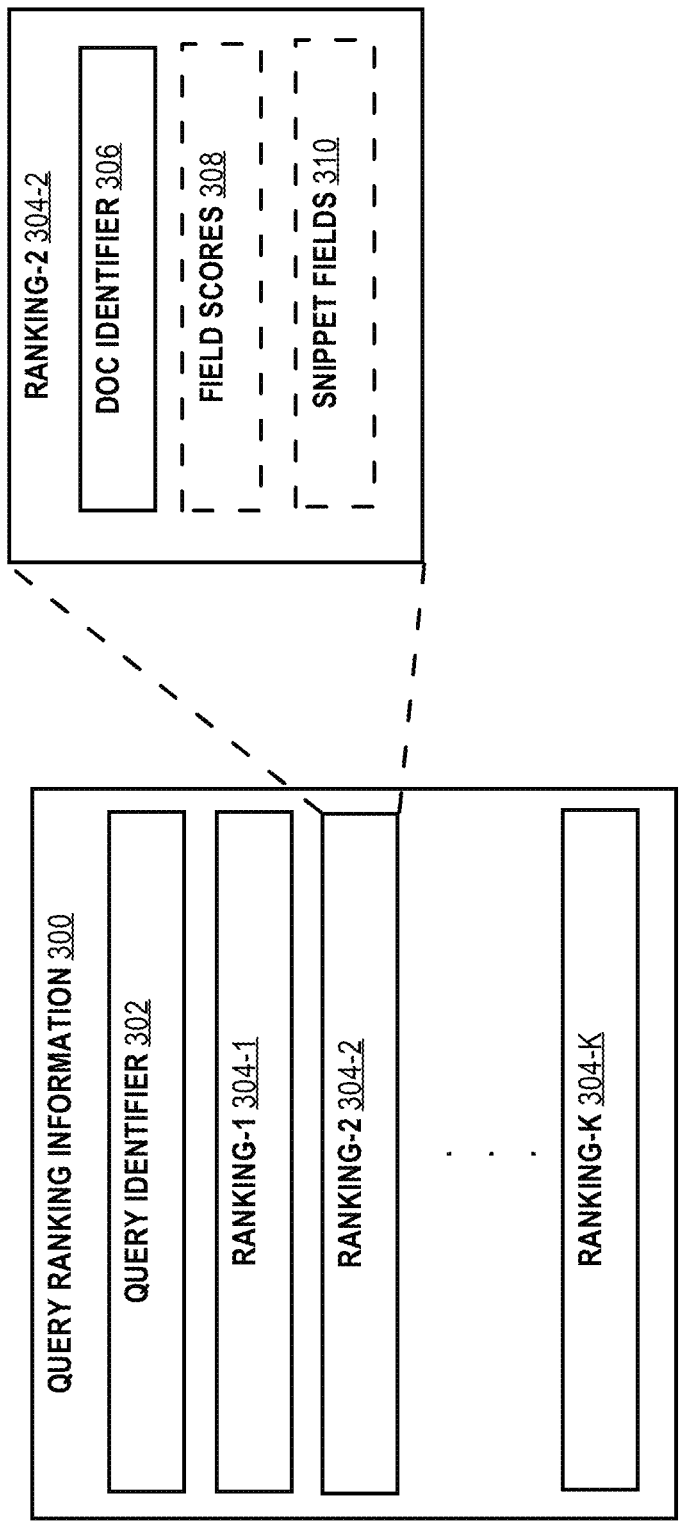
FIG. 3 is a block diagram of ranking information for a query that may be stored in a ranking log according to aspects of the present disclosure.

FIG. 3 is a block diagram of query ranking information 300 stored in a ranking log 116 for a query 110 processed by the top-k retrieval system 108 according to some aspects. The ranking log 116 may store query ranking information 300 for each of multiple queries 110 processed by the top-k retrieval system 108. The query ranking information 300 for a query 110 includes a query identifier 302 of the processed query and ranking information 304 for each of the top-k documents provided in a search result 112 to the processed query. The ranking information 304 for each of the top-k documents may be recorded in the ranking log 116 with an indication of a corresponding ranking score, as computed by the top-k retrieval system 108 when processing the query. For example, the ranking information 304 for each of the top-k documents may be recorded in the ranking log 116 in order of the corresponding ranking scores. Thus, ranking information 304-1 may be for the top-k document receiving the highest or best ranking score of the top-k documents, ranking information 304-2 may be for the top-k document receiving the next highest or next best ranking score of the top-k documents, and so on down to ranking information 304-K for the top-k document with the lowest or worst ranking score of the top-k documents.

The query identifier 302 uniquely identifies the processing query. Thus, ranking information 300 for a particular query 110 can be identified in the ranking log 116 based on the query identifier 302 of the particular query. In addition, the query identifier 302 may be used by the optimizer system 114 to join information about the query in the ranking log with information about the query in the user response log 118. Note that each instance of a query submitted to top-k retrieval system 108 may be separately identified by a corresponding query identifier 302 in the ranking log 116. That is, two or more queries 110 all with the same query expression (e.g., same query terms) may be associated with separate query identifiers 302 such that each of the two or more queries 110 is uniquely identified by its corresponding query identifier 302 in the ranking log 116. Of course, not all queries 110 may have the same query expression. Indeed, it may be the case that none of the queries 110 have the same query expression.

For each of the top-k matching documents for the processed query, the query ranking information 300 for the top-k document may include a document identifier 306, and, optionally, individual field scores 308 and snippet fields 310 pertaining to the top-k document may also be stored in the ranking log 116.

The document identifier 306 uniquely identifies a document 102 matching the query 110 identified by the query identifier 302 of the ranking information 300.

If the ranking score for the matching document was computed by the top-k retrieval system 108 according to a parametrized ranking function such as the ranking function described above, then the ranking information 304 for the matching document may include individual field scores 308. These scores 308 may include individual field scores used in the ranking function by the top-k retrieval system 108 to compute the ranking score for the matching document. For example, the individual field scores 308 that are recorded in the ranking log 116 for the matching document may be the query-dependent and/or query-independent field scores that were boosted (weighted) in the ranking function. By recording the individual field scores 308 in the ranking log 116 for a document 102 matching a query 110, the optimizer 116 can compute a new ranking score for the document using the ranking function with a different set of boost factors using the individual field scores 308 in the ranking log 116 without having to re-compute the individual field scores 308.

In some embodiments, all boosted (weighted) individual field scores used to compute the ranking score for the document are recorded as the individual field scores 308. With the example ranking function discussed above, this would include recording the maximum score for each text field for each term in the query $$\left( t \in T \max_{f \in F_q} s_{f,t} \right)$$

used to compute the query-dependent score ($S_{query\text{-}dependent}$) for the document and each non-text field score ($f \in F_{nq} s_f$) used to compute the query-independent score ($S_{query\text{-}independent}$) for the document.

Optionally, the snippet fields 310 (or identifiers thereof) presented in the snippet for the matching document may be recorded in the ranking log 116. The snippet fields 310 may identify the snippet fields that were presented in the snippet and the order in which they were presented in the snippet. For example, for the matching document represented by snippet 210B of FIG. 2, the snippet fields 310 for the document indicate that the "Privacy" snippet field and the "Last viewed" snippet field were presented for the document and that the "Privacy" snippet field was presented before (reading from left to right) the "Last Viewed" snippet field. Alternatively, snippet fields 310 may simply record a snippet scheme identifier. The snippet scheme identifier may identifier a snippet presentation scheme according to which the snippet for a document was presented in the search result. For example, a first snippet presentation scheme may be of the form "[X]-[Y]-[Z]" where [X] is a Privacy snippet, [Y] is a Path snippet field, and [Z] is Last Viewed snippet field. In a second snippet presentation scheme, [X] and [Z] are the same snippet field types but [Y] is a Path Tail snippet field instead of a Path snippet field. The snippet fields 310 for a document may indicate whether the snippet for the document presented in the search result was formatted according to the first snippet presentation scheme or the second snippet presentation scheme, for example. Other snippet presentation schemes using the same snippet fields in a different order or different snippet fields are possible and the techniques disclosed here are not limited to any particular combination of snippet fields or any particular snippet presentation scheme or set of snippet presentation schemes.

It will be appreciated that if all of the top-k documents matching a query 110 were presented in result content according to the same snippet presentation scheme, then the snippet scheme identifier for the query may be stored once in ranking log 116 as part of the query ranking information 300 for the query instead of storing multiple times in ranking log 116 as part of ranking information 304 for each top-k document matching the query.

User Response Log

Snippets presented in a search result page may be interactive. For example, each of snippets 210A-210E in FIG. 2 may be interactive allowing the querying user to interact with a selected document in some way. For example, interacting with a snippet 210A may cause the result content 200 to be replaced or overlaid on the querying user's computer display with "document" content that presents the document's contents, or a portion thereof. The document content may present the document's contents in a viewing or editing mode. In either case, the document content may provide more information about the document's contents than is provided by the snippet 210A.

From viewing the document content, the querying user may decide that the document is one that the querying user is interested in or is looking for. From there, the querying user may dwell on the document content, perhaps reading the contents of the document content for some time and/or take some additional action on the document such as editing the document, sharing the document, or downloading the document. On the other hand, the querying user may decide, from viewing the document content, that the document is not one the querying user is interested in or is looking for. In that case, the querying user may dismiss or navigate away from the document content to other content. For example, the querying user may navigate back to the result content where the querying user may interact with a different snippet (e.g., 210B) to select a different document. In some cases, the querying user may decide that none of the snippets presented in the result content are interesting enough to warrant further investigation. In that case, the user may dismiss the result content without interacting with any of the snippets presented therein. For example, the user may enter a new query without interacting with any of the snippets 210A-210E.

Interaction with a snippet by the querying user may take the form of a "click." For example, the querying user may use a pointing device (e.g., a mouse) to select one of the snippets of the result content. However, it will be appreciated that a click by the querying user may take other forms appropriate with the type of user device at hand. For example, if the querying user's personal computing device has a touch screen display, then a click by the querying user may take the form of touch input or touch gesture directed to a location of the screen where a snippet is displayed. Thus, click as used herein refers to a user input appropriate with the type of input device being used to provide the input.

According to some embodiments, the click collector 122 records click events corresponding to user clicks 120 in the user response log 118. The user clicks 120 may correspond to the querying user performing any of: dismissing or navigating away from a search result 112, selecting a snippet for a document presented in a search result 112, and dismissing or navigating away from document content for a document presented in response to selection of the snippet for the document presented in result content.

A click event corresponding to a user click 120 recorded in the user response log 118 by the click collector 122 may specify a query identifier, a click event type, click event data, and/or a timestamp. The query identifier identifies the query 110 to which the user click 120 and the click event pertains. This query identifier may be used by the optimizer 114 to correlate user response information for the query in the user response log 118 with ranking information for the query in the ranking log 116. The click event type may indicate whether the corresponding user click 120 was a dismissal or navigation away from a page or instead a selection of an item (e.g., a snippet) within the results. The click event data may depend on the click event type. If the click event type is a dismissal or navigation away from a document page, then the click event data may specify an identifier of the document (doc ID) that was dismissed or navigated away from. If the click event type indicates a selection of a snippet in the search results page for the query, then the click event data may also specify the identifier of the document (doc ID) that was selected. There may be no click event data or the click event data may be empty (null) if the click event type indicates that the querying user dismissed or navigated away from the search results page. The timestamp of the logged click event specifies a clock time indicating when the corresponding user click occurred.

Other click information may be stored in the user response log 118 for a user click 120. For example, if the user click 120 selected a snippet corresponding to matching document presented in result content, then the user response log 118 may record for the user click 120 the ranking of the matching document among the top-k matching documents presented in the result content in addition to or instead of other information that specifies or indicates a ranking order the matching document relative to the other top-k matching documents presented in the result content. The recorded ranking provides an indication of how far down the document receiving the user click was in the ranking of the top-k matching documents.

Other click information that may be stored in the user response log 118 for a user click 120 may include a label indicating whether the user click was a "long" click, a "short" click, or a "dismissal." A user click 120 may be labeled as a long click, if the content that is caused to be presented to the user in response to the user click is presented for at least a threshold amount of time before the user dismisses the content. For example, if document content presented in response to a user click 120 on a snippet corresponding to the document in result content is displayed for at least a threshold amount of time before the document content is dismissed, then the user click may be labeled a long click. A user click 102 may be labeled as a short click, if the content caused to be presented to the user in response to the user click is presented for less than a threshold amount of time before the user dismisses the content. For example, if document content presented in response to a user click 120 on a snippet corresponding to the document in result content is displayed for less than a threshold amount of time before the document content is dismissed, then the user click may be labeled a short click.

A user click 102 that dismisses, closes, or navigates away from result content or document content can be recorded in the user response log 118 as a dismissal. In some implementations, the amount of time a user dwells on document content for purposes of determining whether a user click 120 on a corresponding snippet for the document is a long click or a short click is based on a difference in time between a time of the user click on the snippet and a time of a user click 120 that dismisses the document content.

Optimization Process

Figure 4:
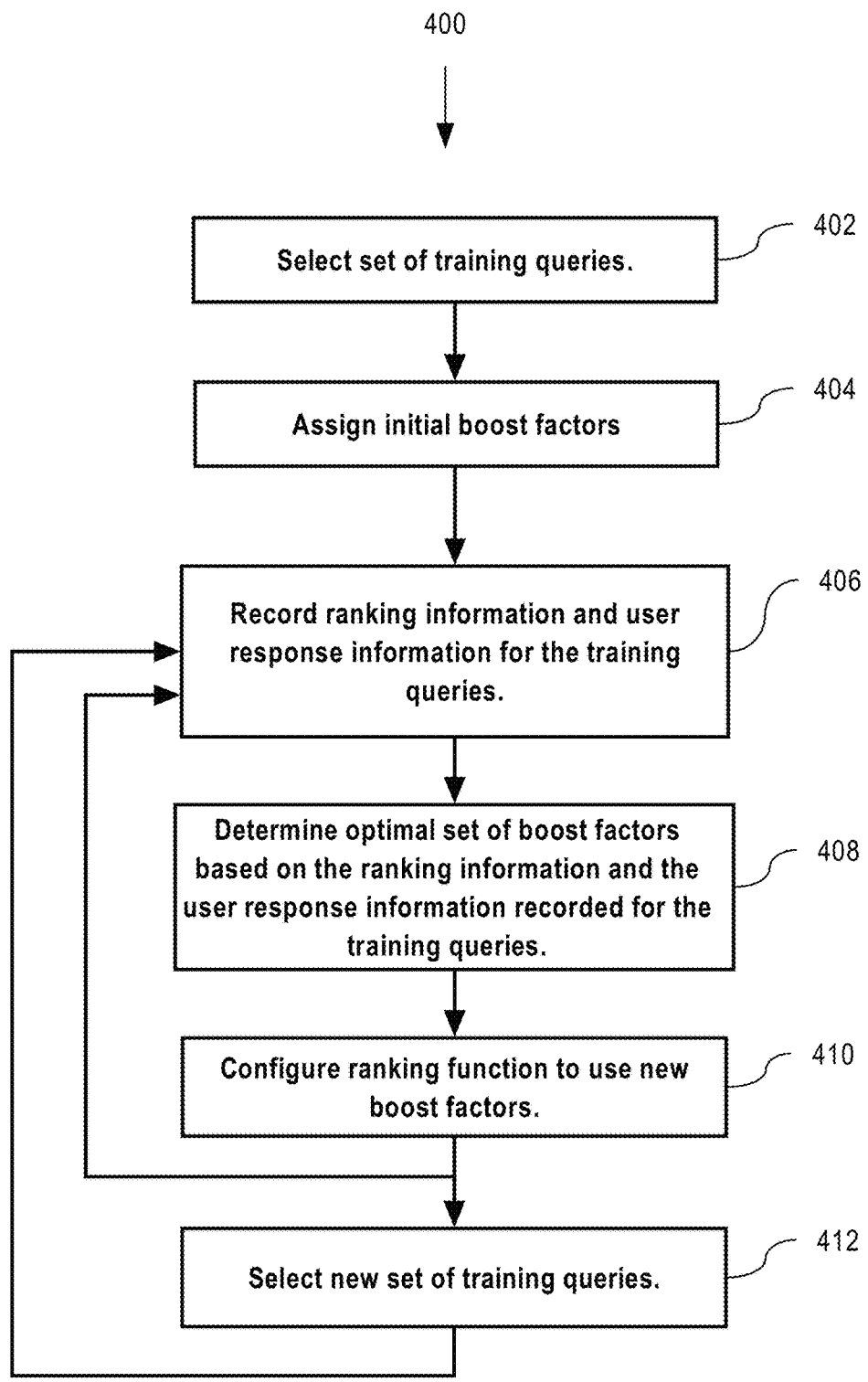
FIG. 4 is a flowchart of a process for optimizing search result relevance according to aspects of the present disclosure.

Turning now to FIG. 4, it is a flowchart of a process 400 for assigning boost factors to individual field scores of a ranking function according to some aspects of the present disclosure.

At operation 402, a set of training queries is selected. The selected set of training queries will be the set of queries used to determine a new set of boost factors for the ranking function. The selected set of training queries can be the set of all queries from all users received by an information retrieval system over a period of time, or a subset thereof. If a subset, the subset may be selected based on various properties of the query. For example, the set of training queries may be the set of all queries from a particular user or a particular set of users received by the information retrieval system over a period of time. The process is not limited to any particular set of training queries. However, the set of training queries selected can be selected to be representative of the set of queries that will be processed using the ranking function with the new set of boost factors.

It will be appreciated that just because a query is referred to herein as a "training" query, the query is not limited to being used solely for the purpose of determining a new set of boost factors. Instead, a training query may be an actual live query submitted to the top-k retrieval system by a real human user of the system that is expecting the system to provide relevant search results to the query.

At operation 404, an initial set of boost factors are assigned to the individual field scores used in the ranking function. The initial set of boost factors may be selected according to an existing technique for assigning boost factors such as the trial and error approach described in the background section above. The process 400 is not limited to any particular technique for selecting the set of initial boost factors. To assign the initial boost factors, the ranking function of the information retrieval system may be configured to use the set of initial boost factors when computing ranking scores for documents for the selected set of queries.

At operation 406, ranking information and user response information for the selected set of training queries is recorded or logged in the ranking log and the user response log, respectively. The ranking information and the user response information recorded in the ranking log and the user response log for each of the training queries may include the information discussed above.

At operation 408, the optimizer system 114 computes an updated set of boost factors using the ranking information and the user response information recorded for the training queries. To do so, the optimizer 114 first computes ground truth rankings for each of the training queries based on the user response information recorded in the user response log for the training queries.

Ground Truth Ranking

Each query in the training set of queries corresponds to an ordered list of k documents as reflected by the ranking information recorded in the ranking log for the query. The value k may be the same for all training queries or may vary among the training queries. The order of the k documents for each query is determined by the top-k retrieval system 108 based on the current (e.g., the initial) set of boost factors used in the ranking function.

According to some embodiments, the optimizer 114 determines a ground truth ranking for each of the training queries for which at least one snippet in the search result of the query receives a click from the querying user. The ground truth ranking for a query reflects how the querying user actually responded to the search result for the query. To determine the ground truth ranking for a query, each of the top-k documents provided in the search result to the query is assigned a relevance label. According to some embodiments, there are four categories of relevance and corresponding relevance labels: "good" (most relevant), "fair" (somewhat relevant), "bad" (not relevant), and "unknown." The labels may be assigned based on the user response information recorded in the user response log for the query.

Figure 5:
FIG. 5 is a table of rules for assigning relevance labels to documents ranked in a search result to a query according to aspects of the present disclosure.

FIG. 5 provides a table of rules 500 that may be used by the optimizer 114 in assigning relevance labels to each of the top-k documents provided in a search result to a training query. The assignments may be made based on the user response information recorded in the user response log for the training query. The optimizer 114 may assign relevance labels according to these rules 500 for each top-k document of each training query recorded in the ranking log.

As shown in FIG. 5, if a search result document receives a long click according to user response information for the document in the user response log, then the document is assigned a relevance label of "good." A long click may be defined as the querying user dwelling on the document page for the document for at least a threshold period of time (e.g., at least 15 seconds) after selecting the search result snippet for the document in the search results and before dismissing or otherwise navigating away from the document page.

If a search result document receives a short click according to user response information for the document in the user response log, then the document is assigned a relevance label of "fair." A short click may be defined as the querying user dwelling on the document page for the document for less than the threshold period of time (e.g., less than 15 seconds) after selecting the search result snippet for the document in the search results and before dismissing or otherwise navigating away from the document page.

If a search result document does not receive a long click or a short click and is ranked higher or better than a search result document that did receive a long click or a short click then it is assumed that the querying user saw the search result snippet for the document and decided based on the snippet that the document was not relevant. In this case, the document is assigned a relevance label of "bad."

All search result documents in the top-k documents ranked lower or worse than the lowest ranked document in the top-k documents that did receive a long click or a short click is assigned a relevance label of "unknown."

In some embodiments, if no document in the top-k documents received a long click or a short click, then a ground truth ranking is not determined for the training query and the query is ignored.

For example, using the search results page 200 of FIG. 2 as an example, suppose the querying user short clicks on snippet 204B and then long clicks on snippet 204C. The long click on snippet 204C indicates that the document represented by snippet 204C is a "good" search result and thus the document is assigned a relevance label of "good." The short click on snippet 204B indicates that the document represented by snippet 204B is a "fair" search result and thus the document is assigned a relevance label of "fair." Assuming the querying user browses the search result 200 from top to bottom, it is assumed that, because the querying user clicked on a snippet below snippet 204A, the snippet 204A was intentionally skipped by the querying user. Accordingly, the document represented by snippet 204A is assigned a relevance of "bad." Because snippets 204D and 204E represent documents that are ranked lower than the lowest ranked document that did receive a long click or a short click (i.e., the document represented by snippet 204C), the documents represented by snippets 204D and 204E are both assigned a relevance label of "unknown."

Once relevance labels have been assigned to each of the top-k documents for a query, ordered relationship pairs of the top-k documents are generated according to their assigned relevance labels. In the ordered pairings, each "good" document is paired with each "fair" document, with the "good" document ordered higher in the pair than the "fair" document. Each "good" document is also paired with each "bad" document, with the "good" document ordered higher in the pair than the "bad" document. Each "fair" document is also paired with each "bad" document, with the "fair" document ordered higher in the pair than the "bad" document. Each "good" document may also be paired with each "unknown" document so that a ground truth ranking is available for queries where the highest ranked document received a long click and no other documents in the top-k received a click.

It is possible for multiple documents to be assigned the same relevance label. In particular, multiple of the top-k documents for a query may be assigned a "good" label if each of those documents receive a long click and/or multiple of the top-k documents for a query may be assigned a "fair" label if each of those documents receive a short click. Multiple documents in the same relevancy category can be pairwise ordered based on the time of the clicks and according to a click relevancy model. In one implementation of the click relevancy model, an earlier click is considered to be more relevant than a later click on the assumption that the querying user viewed the snippets for both documents and decided to investigate the document receiving the earlier click before investigating the document receiving the later click. According to this model, if there are multiple "good" documents, then the "good" documents are paired with each other, with the document receiving the earlier long click preceding in the pair the document receiving the later long click. Similarly, if there are multiple "fair" documents, then the "fair" documents are paired with each other, with the document receiving the earlier short click preceding in the pair the document receiving the later short click.

For example, in the previous example based on the search results 200 of FIG. 2, the following pairings may be generated assuming documents D1, D2, D3, D4, and D5 corresponding to snippets 204A, 204B, 204C, 204D, and 204E, respectively:

Pair 1: Good document D3 Fair document D2
Pair 2: Good document D3>Bad document D1
Pair 3: Fair document D2>Bad document D1
Pair 4: Good document D3>Unknown document D4
Pair 5: Good document D3>Unknown document D5.

In this way, ordered pairings may be generated for each training query for which at least one document was clicked.

Other Click Relevancy Models

The click relevancy model embodied by the rules 500 of FIG. 5 is just one example of a possible click relevancy model for assigning relevancy labels to top-k documents returned in search results to training queries. Other models are possible.

Optimization Algorithm

According to some embodiments, an optimization algorithm (e.g., Powell or Nelder-Mead) is executed to determine a set of boost factors that minimizes a cost function. According to some embodiments, the cost function is defined as the sum of the number of inversions for all training queries for which ordered pairings are generated (e.g., all training queries for which at least one document received a clicked). According to some embodiments, the number of inversions for a training query is measured according a Kendell tau distance between the ordered ground truth pairings generated for the training query and a ranking of the top-k documents for the training query generated using the ranking function with the individual field scores recorded in the ranking log for the query and a predicated set of boost factors applied to the individual field scores. The goal of the optimization algorithm is to predicate a set of boost factors that minimizes the total number of inversions across all training queries for which ordered pairings are generated. For example, an optimization algorithm such as Powell's method or Nelder-Mead's method or other method for finding the minimum of a cost function with several variables.

In some embodiments, the cost function is not-differentiable. In this case, an optimization algorithm that does not require a differentiable cost function may be used. Examples of such algorithms include Powell's method and Nelder-Mead's method. In other embodiments where the cost function is differentiable, an optimization algorithm that requires derivatives may be used for better compute performance such as, for example, gradient descent.

At operation 410, the top-k retrieval system 108 is configured to use the ranking function with the new set of boost factors. Operations 406, 408, and 410 may be performed again to optimize the new set of boost factors either using the same criteria to select a set of training queries or by using new criteria to select a set of training queries (operation 412). In this way, a new set of boost factors may be periodically determined based on recent search activity.

Machine Learning Approaches

In addition to or instead of an optimization process such as the one described above that aims to optimize a set of boost factors for use in a ranking function, machine learning may be employed to train a ranking model for ranking documents matching queries. In addition, machine learning may be used to train a snippet selection model for selecting snippet fields to present in result content for the top-k matching documents. The machine learning approaches may be based any one of a number of different machine learning technologies including, for example, an artificial neural network, a support vector machine (SVM), a decision support system, etc.

Figure 6:
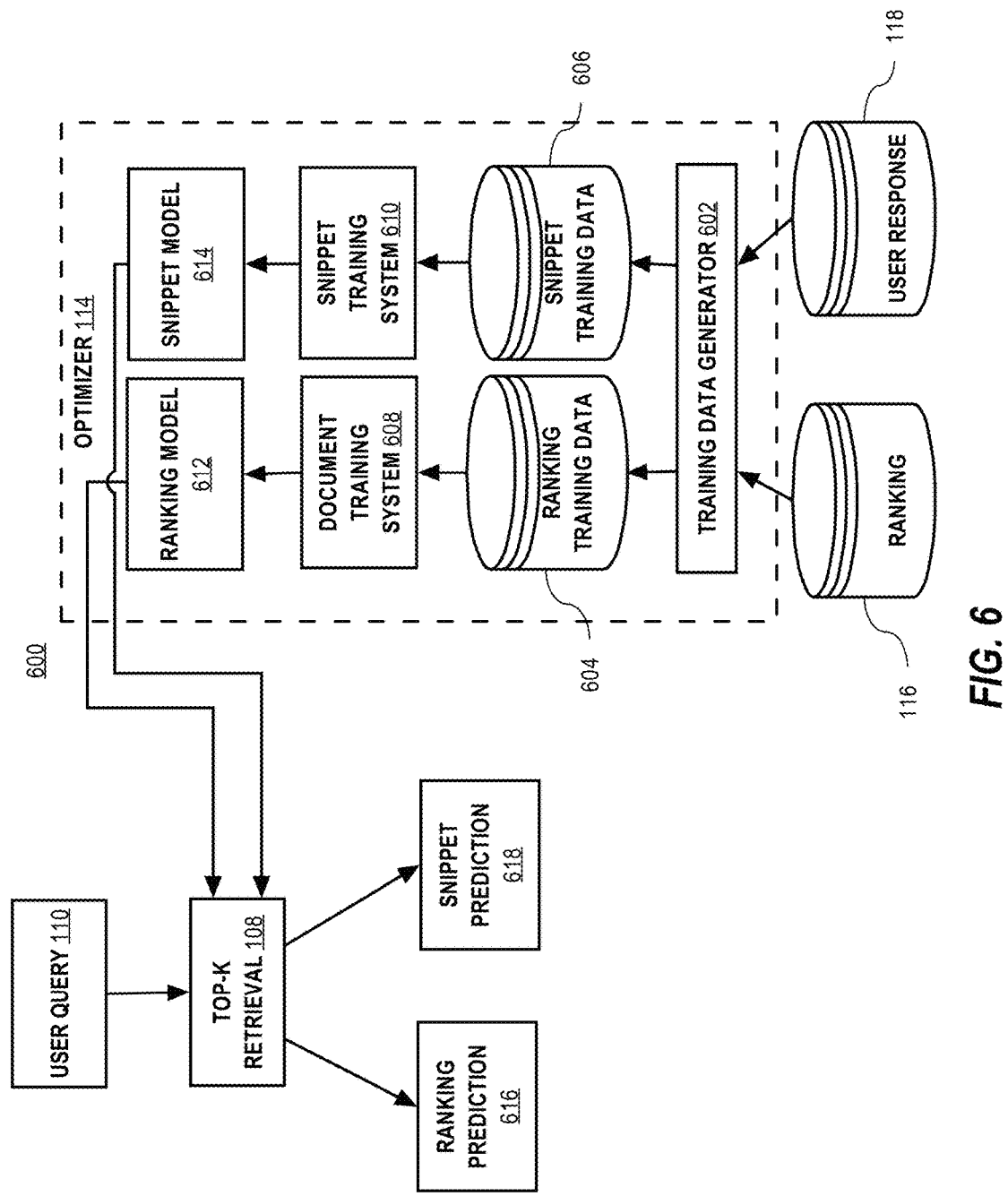
FIG. 6 is a block diagram of a machine learning system for training a document ranking model and a snippet selection model according to aspects of the present disclosure.

FIG. 6 is a block diagram of a machine learning system 600 within the optimizer 114 for training a document ranking model 612 and a snippet selection model 614 using supervised machine learning techniques. As supervised machine learning techniques are employed, the system 600 includes a training data set 604 for training the document ranking model 612 and a training data set 606 for training the snippet selection model 614. The document ranking training set 604 and the snippet selection training set 606 may be generated by training data generator 602 based on information in ranking information log 116 and/or information in user response log 118.

Document Ranking Training Set

In some implementations, the document ranking training set 604 comprises training data pertaining to a number of queries 110 (e.g., a selected set of training queries as described above). For each such query, the top-k documents returned in the result 112 to the query are represented in the document ranking training set 604 by feature vectors. Specifically, each of the top-k documents for a query is represented by a feature vector that reflects the relevance of the document to the query. A feature vector for a top-k document matching a query can be based on a number of different features including any, some, or all of the boosted query-dependent and/or query-independent fields discussed above with respect to the example parameterized ranking function. For example, the individual field scores 308 recorded for a top-k document matching a query in the ranking log 116 may be used by the training data generator 602 to generate a feature vector for the document.

The document ranking training set 604 also comprises a relevancy judgment for each top-k document matching a query 110. The relevancy judgment for a document reflects a human or machine judgment of how relevant the document is to the query. A number of different strategies may be used for the relevancy judgment. For example, a relevancy judgment for a document may specify whether a document is or is not relevant to the query. In addition, or alternatively, a relevancy judgment for a document may specify the degree of relevance (e.g., "Good," "Fair," "Bad," or "Unknown"). In addition, or alternatively, a relevancy judgment may encompass a pairwise judgment in which one of the top-k documents is deemed to be more relevant than another of the top-k documents with regards to the query. In addition, or alternatively, a relevancy judgment may encompass a partial or total ordering of the top-k documents with respect to the query. Overall, the training data generator 602 may employ any one or a number of different relevancy judgment strategies. In addition, one or more of the strategies may be based on information for judged documents in user response log 118. For example, training data generator 602 may automatically generate pairwise relevancy judgments as described above with respect to the discussion of an example boost factor optimization process based on user clicks 120 for documents recorded in user response log 118.

Document Ranking Approaches Using Machine Learning

Once the document ranking training data 604 is available, the document training system 608 may employ a specific learning algorithm to learn the document ranking model 612. The document ranking model 612 represents a way of combing the feature vectors, such that the output of the document ranking model 612 can predict a ground truth label in the ranking training data 604 as accurately as possible, in terms of a loss function.

When a new query 110 is received by the top-k retrieval system 108, the learned ranking model 512 may be applied to sort the top-k documents identified by the top-k retrieval system 108 according to their relevance to the query, and return the corresponding ranked list to the user as a result 112 to the query 110.

System 600 is not limited to any particular machine learning approach for document ranking and a variety of different machine learning approaches may be used. For example, a pointwise, a pairwise, or a listwise approach may be used to learn a ranking for a set of documents matching a given query.

Machine Learning Process

Figure 7:
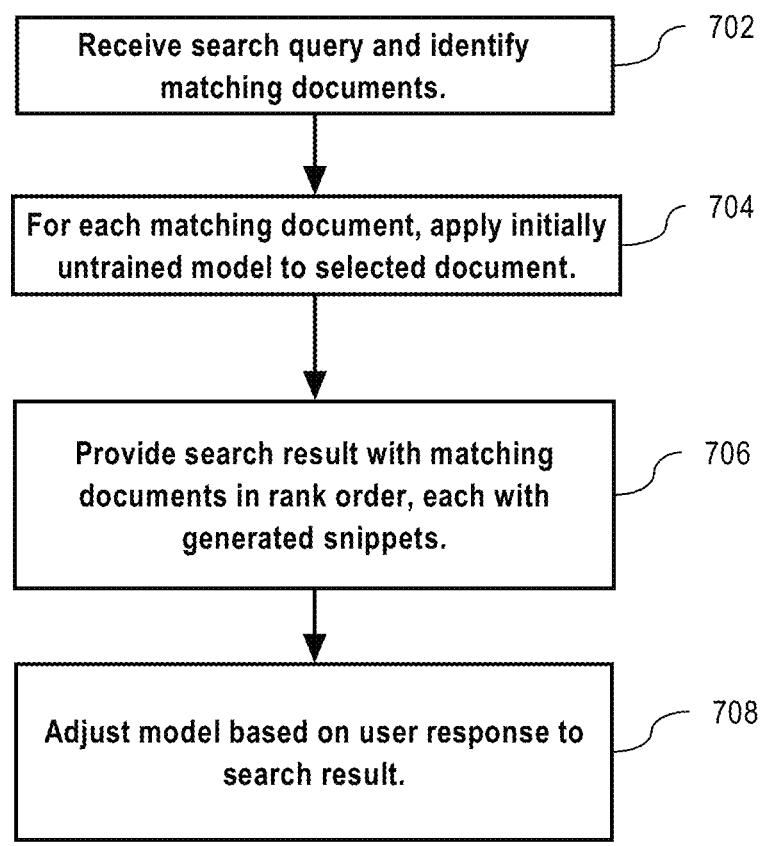
FIG. 7 is a flowchart of a machine learning approach for document ranking and snippet selection according to aspects of the present disclosure.

Turning now to FIG. 7, it is a flowchart 700 of a machine learning process for document ranking and snippet selection according to some embodiments. Initially, at operation 702, a search query 110 is received by the top-k retrieval system 108. In response to receiving the search query, the top-k retrieval system 108 consults document index 106 to identify a number of documents (k) matching the query. The top-k retrieval system 108 may rank the k matching documents according to a ranking function that generates ranking scores for the k matching documents. However, it is not required of the process that the k matching documents be ranked according to a ranking function.

At operation 704, the document ranking model 612 and the snippet selection model 614 may be initially untrained. The initially untrained document ranking model 612 may be applied to rank (order) the k matching documents for the query. Further, the initially untrained snippet selection model 614 may be applied to select a set of one or more snippet fields for each of the k matching documents. When applying the models 612 and 614 to the k matching documents, various features may be input to the models 612 and 614. The features may include query-specific features such as one or more query-dependent field scores discussed above with respect to the example parameterized ranking function. The features may also include query-independent features such as one or more of the query-independent field scores discussed above with respect to the example parameterized ranking function.

The output of document ranking model 612 can provide a ranking for the k matching documents. This can be provided in the form of a ranking score for each of the k matching documents by which the k matching documents can be sorted in ranking order, or a total ordering of the k matching documents in rank order. The output of the snippet model 614 can provide a set of snippet field types to display. The set of snippet field types may include one or more of the snippet field types described above. The snippet model 614 may output a set of snippet fields types for each of the k matching documents for the query. Alternatively, the snippet model 614 may output a set of snippet fields types to apply to all of the k matching documents for the query. In some implementations, a set of snippet field types is identified in the output of the snippet model 614 by a snippet scheme identifier. Within a set of snippet field types, the snippet field types may be ordered. The order within the set may reflect the presentation order of the snippet fields in a snippet. For example, one set of snippet field types may consist of an identifier of the Last Viewed snippet field type followed in order by an identifier of the Edited snippet field type. Another set of snippet fields types may consist of an identifier of Path Tail snippet field type, followed in order by an identifier of the Last Viewed snippet field type, followed in order by an identifier of the Edited snippet field type.

At operation 706, when generating result content to return in the result 112 to the query, the top-k retrieval system 108 may format the result content according to the output of the models 612 and 614. Specifically, the snippets in the result content may be presented in order of the ranking of the corresponding k matching documents based on the output of the document ranking model 612 for the query. Within each snippet, snippet fields may be presented according to the output of the snippet selection model 614.

In some circumstances, a snippet field type selected for one of the k matching documents by the snippet selection model 614 may be omitted by the top-k retrieval system 108 from the snippet representing that document if the snippet field type is not appropriate for that document. For example, if the Privacy snippet field type is selected for the document and the querying user is not authenticated or the querying user does not have the appropriate level of access to the document, then the Privacy snippet field may be omitted by the top-k retrieval system 108 from the snippet for the document provided in the result content. Similarly, the top-k retrieval system 108 may add a snippet field to a snippet that is not selected for the document by the snippet selection model 614. For example, if the querying user is authenticated, then the top-k retrieval system 108 may add the Privacy snippet as the first snippet field to each snippet returned from the k matching documents in the result content in addition to the snippet fields selected by the snippet selection model 614.

At operation 708, the document ranking model 612 and/or the snippet selection model 614 is adjusted (or not adjusted) based the querying user's response to the result 112. Specifically, parameters of the document ranking model 612 and the snippet selection module 614 are adjusted, or not adjusted, to reinforce selections made and selections not made by the querying user as recorded in the user response log 118 as user click data.

For example, if a snippet corresponding to a top-k document received the first long click after result content is presented to the user indicating that the document is relevant to the query, then parameters of the document ranking model 612 may be adjusted to boost the ranking for the document. Specifically, if the document receiving the long click was not the highest (best) ranked document of the top-k documents, then parameters of the document ranking model 612 may be adjusted (trained) so that the document ranking model 612 would rank or would be more likely to rank the document as the highest (best) ranked document of the top-k documents for the query.

If a snippet corresponding to a top-k document for the query is skipped, then parameters of the document ranking model 612 may be adjusted to decrease the ranking for the document. A document may be identified as skipped if the snippet for the document did not receive a short click or a long click and a snippet for a lower (worse) ranked top-k document received a long click or a short click. In this case, the parameters of the document ranking model 612 may be adjusted (trained) so that that document ranked model 612 would rank or would be more likely to rank the skipped document lower than the all of the top-k documents receiving a short click or a long click.

If a snippet corresponding to the highest (best) ranked top-k document received a long click, then the parameters of the document ranking model 612 may be maintained (not adjusted) as the provided ranking provided a relevant document as the highest (best) ranked document.

Parameters of the snippet selection model 614 may also be adjusted or maintained based on the querying user's response to the snippet fields presented in the result 112.

For example, if a snippet corresponding to a top-k document received the first long click after result content is presented to the user indicating that the document is relevant to the query and that the particular set of snippet field types presented in the snippet did not mislead the querying user as to the relevance of the document, then parameters of the snippet selection model 614 may be adjusted to reinforce the selection of the set of snippet field types.

If a snippet corresponding to a top-k document received a short click indicating that the document initially appeared to be relevant to the querying user based on the set of snippet field types presented in the snippet but then the querying user decided on closer inspection of the document that the document was not as relevant as originally thought, then parameters of the snippet selection model 614 may be adjusted so that that snippet selection model 614 discourages the selection of the set of snippet field types on the basis that the set of snippet field types misled the querying user to believe that the document was relevant.

If a snippet corresponding to a top-k document was initially skipped and then later received a short click or a long click indicating that the set of snippet field types presented in the snippet misled the querying user to initially believe that the document was not relevant, then parameters of the snippet selection model 614 may be adjusted so that the snippet selection model 614 discourages the selection of the set of snippet field types on the basis that the set of snippet field types misled the querying user to believe that the document was not relevant.

If result content is dismissed after receiving only one or more short clicks on one more snippets and no long clicks are received on any of the snippets for the top-k documents, then parameters of the snippet selection model 614 may be adjusted so that the snippet selection model 614 discourages selection of all sets of snippet field types presented in the result content on the basis that the sets of snippet field types did present enough information for the querying user to determine that none of the results were sufficiently relevant to the query.

The above description refers to adjusting a machine learning model to reinforce or discourage certain learning outcomes. Such adjusting may be accomplished by changing the values of numerical weights applied to parameters of the model. For example, the weights may be changed to minimize of a loss function of the model where the model is trained from a training set that reflects the results of user clicks.

Hardware Overview

The operations/techniques described herein are implemented by one or more special-purpose computing systems or devices. A special-purpose computing system may be hard-wired to perform the relevant operations. Alternatively, a special-purpose computing system may include digital electronic devices such as one or more application-specific integrated circuits (ASICs) or field programmable gate arrays (FPGAs) that are persistently programmed to perform the relevant operations. Further alternatively, a special-purpose computing system may include one or more general purpose hardware processors programmed to perform the relevant operations pursuant to program instructions stored in firmware, memory, other storage, or a combination thereof.

A special-purpose computing system may also combine custom hard-wired logic, ASICs, or FPGAs with custom programming to accomplish the relevant operations described herein. A special-purpose computing system may be a desktop computer system, a portable computer system, a handheld device, a networking device or any other device that incorporates hard-wired and/or program logic to implement relevant operations.

Figure 8:
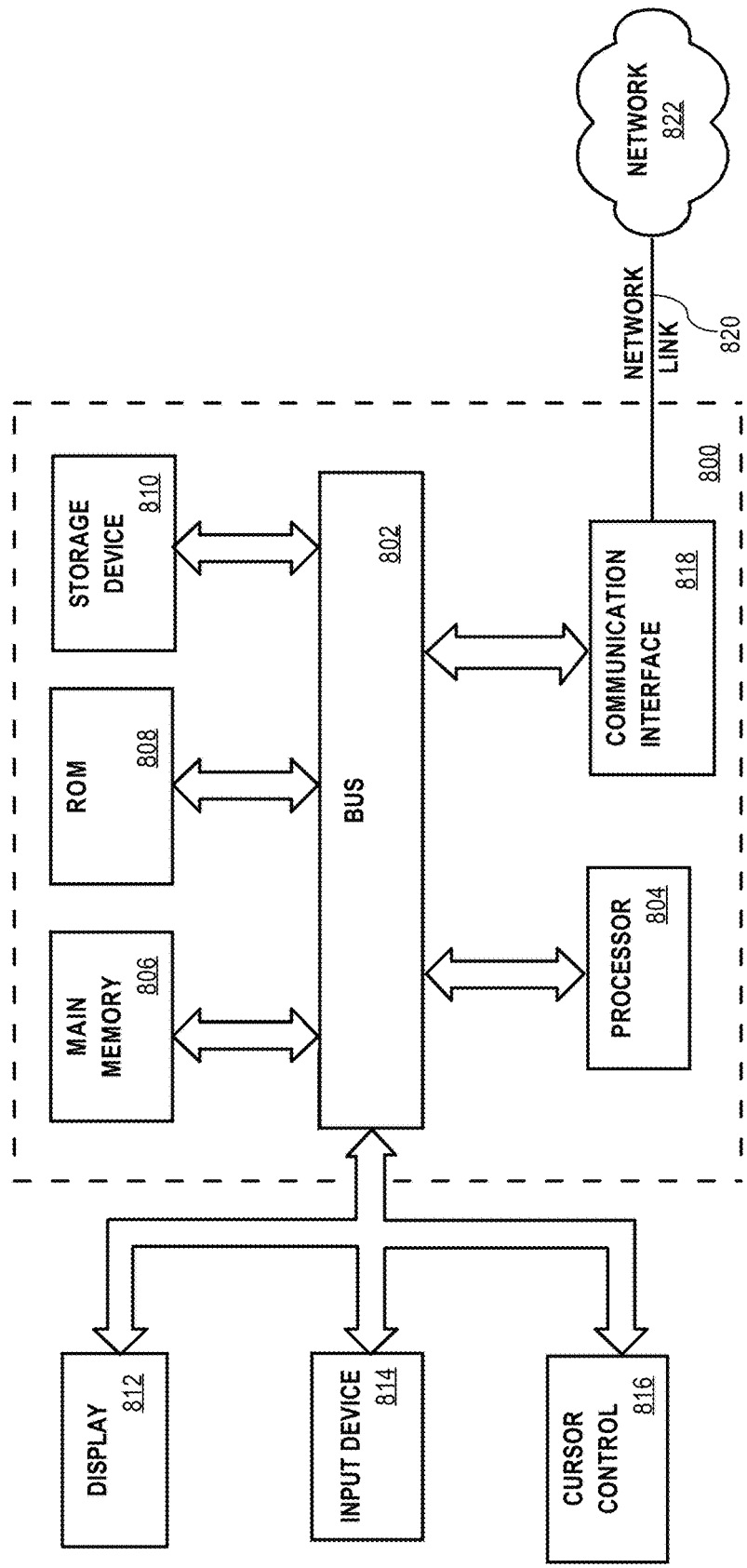
FIG. 8 is a block diagram of a computer system with which various aspects of the present disclosure may be implemented.

By way of example, FIG. 8 is a block diagram that illustrates one example of a computer system 800 upon which embodiments of the present technology may be implemented.

Computer system 800 includes a bus 802 or other communication mechanism for communicating information, and a hardware processor 804 coupled with bus 802 for processing information. Hardware processor 804 may be, for example, one or more general purpose microprocessors, a one or more graphical processing units, or other processing unit.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

In case the computer system 800 is a personal computing device, the computer system 800 may be coupled via bus 802 to a display 812 (such as an LCD, LED, touch screen display, or other display), for displaying information to a computer user. In the case the computer system 800 is a server computing device, the computer system 800 may also be coupled to a display 812 but perhaps only temporarily or periodically while maintaining or troubleshooting the computer system 800. At other times, the server computing device may operate "headless" without being coupled to a display 812.

An input device 814, such as a set of alphanumeric or other keys, may be coupled to the bus 802 for communicating information and command selections to processor 804. Another type of user input device is cursor control 816, such as a mouse, a trackball, or cursor direction keys for communicating direction information and command selections to processor 804 and for controlling cursor movement on display 812. In the case the display 812 is a touch screen display, the display 812 may integrate a touch sensitive surface as an input device 814.

According to one embodiment, the techniques herein are performed by computer system 800 in response to processor 804 executing one or more sequences of one or more instructions contained in main memory 806. Such instructions may be read into main memory 806 from another storage medium, such as a remote database. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that stores data and/or instructions that cause a machine to operate in a specific fashion. Such storage media may comprise non-volatile media and/or volatile media. Non-volatile media includes, for example, optical or magnetic disks, such as storage device 810. Volatile media includes dynamic memory, such as main memory 806. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Computer system 800 also includes a communication interface 818 coupled to bus 802. Communication interface 818 provides a two-way data communication coupling to a network link 820 that is connected to a communications network 820. For example, communication interface 818 may be an integrated services digital network (ISDN) card, cable modem, satellite modem, etc. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information. The communications network 820 may include one or more of: the Internet, other wide area networks, local area networks, metropolitan area networks, wireless networks, cellular networks, and so on.

Computer system 800 can send messages and receive data, including program code, through the network 822, network link 820 and communication interface 818.

As described previously, the computer system 800 as described above may be configured in a plurality of useful arrangements. In one arrangement, the computer system 800 is a server computer (such as a computer system hosting some or all of the functionality of top-k retrieval system 108 or optimizer 114) comprising one or more non-transitory computer-readable data storage media stored with one or more sequences of instructions/software modules which when executed cause the computer to perform the operations/techniques that are described herein.

Extensions and Alternatives

In the foregoing specification, embodiments of the present technology have been described with reference to numerous specific details that may vary from implementation to implementation. The specification and drawings are, accordingly, to be regarded in an illustrative rather than a restrictive sense.

As used herein the terms "include" and "comprise" (and variations of those terms, such as "including", "includes", "comprising", "comprises", "comprised" and the like) are intended to be inclusive and are not intended to exclude further features, components, integers or steps.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

As used herein, being above a threshold means that a value for an item under comparison is above a specified other value, that an item under comparison is among a certain specified number of items with the largest value, or that an item under comparison has a value within a specified top percentage amount. As used herein, being below a threshold means that a value for an item under comparison is below a specified other amount, that an item under comparison is among a certain specified number of items with the smallest value, or that an item under comparison has a value within a specified bottom percentage amount. As used herein, being within a threshold means that a value for an item under comparison is between two specified other values, that an item under comparison is among a middle specified number of items, or that an item under comparison has a value within a middle specified percentage range.

Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

Various features of the disclosure have been described using flowcharts. The functionality/processing of a given flowchart step could potentially be performed in various different ways and by various different systems or system modules. Furthermore, a given flowchart step could be divided into multiple steps and/or multiple flowchart steps could be combined into a single step. Furthermore, the order of the steps can be changed without departing from the scope of the present disclosure.

It will be understood that the embodiments disclosed and defined in this specification extends to all alternative combinations of two or more of the individual features mentioned or evident from the text or drawings. All of these different combinations constitute various alternative aspects of the embodiments.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

The invention claimed is:

1. A method performed by a computing system comprising one or more processors and storage media storing one or more programs executed by the one or more processors to perform the method, the method comprising:

receiving a query and identifying a set of documents matching the query;

selecting, for a snippet representing a corresponding document of the set of documents, a set of a plurality of snippet field types from a plurality of predefined snippet field types, the selecting based at least in part on a snippet selection model;

causing display of the snippet, the snippet display including a separate value for each snippet field type in the set of the plurality of snippet field types selected for the snippet detecting a user click on the snippet;

determining a user dwell time, associated with the user click, on the corresponding document;

based at least in part on the user click and the user dwell time, adjusting the snippet selection model to reinforce or discourage selection of the set of the plurality of snippet field types for future queries;

wherein, before the adjusting, the snippet selection model is configured to apply a first set of weights to a set of parameters of the snippet selection model;

wherein, after the adjusting, the snippet selection model is configured to apply a second set of weights to the set of parameters of the snippet selection model;

wherein the second set of weights are different than the first set of weights;

wherein the second set of weights is determined based at least in part on:
  assigning a relevance label to the set of the plurality of snippet field types selected,
  wherein the relevance label is assigned to the set of the plurality of snippet field types selected based at least in part on the user dwell time on the corresponding document,
  determining a ground truth ranking of the plurality of predefined snippet field types;
  wherein the ground truth ranking is determined based at least in part on the relevance label assigned, and
  determining a set of weights that, when applied to the set of parameters of the snippet selection model, minimizes a loss function with respect to at least the ground truth ranking.

2. The method of claim 1, further comprising:
based at least in part on the user click and the user dwell time, adjusting the snippet selection model to reinforce selection of the set of the plurality of snippet field types for future queries.

3. The method of claim 1, further comprising:
based at least in part on the user click and the user dwell time, adjusting the snippet selection model to discourage selection of the set of the plurality of snippet field types for future queries.

4. The method of claim 1, wherein:
the user dwell time is based at least in part on an amount of time that at least a portion of the corresponding document is presented in a graphical user interface in response to the user click on the snippet.

5. The method of claim 1, wherein:
the adjusting the snippet selection model to reinforce or discourage selection of the set of the plurality of snippet field types is further based at least in part on a ranking score for the corresponding document; and
the ranking score is based at least in part on a query-dependent score for at least the query and the corresponding document.

6. The method of claim 1, wherein:
the adjusting the snippet selection model to reinforce or discourage selection of the set of the plurality of snippet field types is further based at least in part on a ranking score for the corresponding document; and
the ranking score is based at least in part on a query-independent score for the corresponding document.

7. A computing system comprising:
one or more processors;
storage media; and
one or more programs stored in the storage media and configured for execution by the one or more processors, the one or more programs comprising instructions configured for:
receiving a query and identifying a set of documents matching the query;
selecting, for a snippet representing a corresponding document of the set of documents, a set of a plurality of snippet field types from a plurality of predefined snippet field types, the selecting based at least in part on a snippet selection model;
causing display of the snippet, the snippet display including a separate value for each snippet field type in the set of the plurality of snippet field types selected for the snippet;
detecting a user click on the snippet;
determining a user dwell time, associated with the user click, on the corresponding document; and
based at least in part on the user click and the user dwell time, adjusting the snippet selection model to discourage selection of the set of the plurality of snippet field types for future queries;

wherein, before the adjusting, the snippet selection model is configured to apply a first set of weights to a set of parameters of the snippet selection model;

wherein, after the adjusting, the snippet selection model is configured to apply a second set of weights to the set of parameters of the snippet selection model;

wherein the second set of weights are different than the first set of weights;

wherein the second set of weights is determined based at least in part on:
  assigning a relevance label to the set of the plurality of snippet field types selected,
  wherein the relevance label is assigned to the set of the plurality of snippet field types selected based at least in part on the user dwell time on the corresponding document,
  determining a ground truth ranking of the plurality of predefined snippet field types;
  wherein the ground truth ranking is determined based at least in part on the relevance label assigned, and
  determining a set of weights that, when applied to the set of parameters of the snippet selection model, minimizes a loss function with respect to at least the ground truth ranking.

8. The computing system of claim 7, wherein
the adjusting the snippet selection model to discourage selection of the set of the plurality of snippet field types is based at least in part on determining that the user dwell time on the corresponding document did not exceed a threshold amount of time; and
the user dwell time is based at least in part on an amount of time that at least a portion of the corresponding document is presented in a graphical user interface in response to the user click on the snippet.

9. The computing system of claim 7, wherein:
the user click is a first user click;
the snippet is a first snippet;
the corresponding document is a first corresponding document;
the instructions are further configured for detecting a second user click, that is not the first user click, on a second snippet, that is not the first snippet, representing a second corresponding document of the set of documents, that is not the first corresponding document;
the adjusting the snippet selection model to discourage selection of the set of the plurality of snippet field types is based at least in part on determining that the second user click happened before the first user click.

10. The computing system of claim 9, wherein:
the adjusting the snippet selection model to discourage selection of the set of the plurality of snippet field types is based at least in part on determining that a user dwell time on the first corresponding document exceeds a threshold amount of time; and the user dwell time is based at least in part on an amount of time that at least a portion of the first corresponding document is presented in a graphical user interface in response to the first user click on the first snippet.

11. The computing system of claim 9, wherein:

the user click on the first snippet is performed while the first snippet and the second snippet are displayed in a graphical user interface;

the first snippet is displayed at a first respective position in the graphical user interface;

the second snippet is displayed at a second respective position in the graphical user interface; and the first respective position and the second respective position are such they visually indicate that the first corresponding document is more relevant to the query than the second corresponding document.

12. One or more non-transitory computer-readable media storing one or more programs for execution by one or more processors, the one or more programs comprising instructions configured for:

receiving a query and identifying a set of documents matching the query;

selecting, for a snippet representing a corresponding document in the set of documents, a set of a plurality of snippet field types from a plurality of predefined snippet field types, the selecting based at least in part on a snippet selection model;

causing display of the snippet in a graphical user interface, the snippet display including a separate value for each snippet field type in the set of the plurality of snippet field types selected for the snippet;

detecting a user click on the snippet;

detecting a user dwell time, associated with the user click, on the corresponding document; and based at least in part on the user click and the user dwell time, adjusting the snippet selection model to reinforce or discourage selection of the set of the plurality of snippet field types for future queries;

wherein, before the adjusting, the snippet selection model is configured to apply a first set of weights to a set of parameters of the snippet selection model;

wherein, after the adjusting, the snippet selection model is configured to apply a second set of weights to the set of parameters of the snippet selection model;

wherein the second set of weights are different than the first set of weights;

wherein the second set of weights is determined based at least in part on:

assigning a relevance label to the set of the plurality of snippet field types selected, wherein the relevance label is assigned to the set of the plurality of snippet field types selected based at least in part on the user dwell time on the corresponding document, determining a ground truth ranking of the plurality of predefined snippet field types;

wherein the ground truth ranking is determined based at least in part on the relevance label assigned, and determining a set of weights that, when applied to the set of parameters of the snippet selection model, minimizes a loss function with respect to at least the ground truth ranking.

13. The one or more non-transitory computer-readable media of claim 12, wherein:

the snippet is a first snippet;

the corresponding document is a first corresponding document;

the instructions are further configured for adjusting the snippet selection model to discourage selection of the set of a plurality of snippet field types based at least in part on all of: a user click on a second snippet that is not the first snippet representing a second corresponding document in the set of documents that is not the first corresponding document, a first ranking score for the first corresponding document, and a second ranking score for the second corresponding document;

the user click on the second snippet is performed while the first snippet and the second snippet are presented in the graphical user interface;

the user click on the second snippet is performed before any click on the first snippet;

the first snippet is presented in the graphical user interface at a first respective position based at least in part in the first ranking score;

the second snippet is presented in the graphical user interface at a second respective position based at least in part on the second ranking score; and the first respective position and the second respective position are such they visually indicate that the first corresponding document is more relevant to the query than the second corresponding document.

14. The one or more non-transitory computer-readable media of claim 12, wherein:

the instructions further configured for computing a weighted snippet field score for each of a plurality of snippet field types based at least in part on the corresponding document; and wherein the adjusting the snippet selection model to reinforce or discourage selection of the set of the plurality of snippet field types is based at least in part on adjusting weights applied to snippet field scores to reinforce or discourage selection of the set of the plurality of snippet field types.

15. The one or more non-transitory computer-readable media of claim 12, wherein at least one snippet field type of the set of the plurality of snippet field types is:

a privacy snippet field, a path snippet field, a truncated path snippet field, a path tail snippet field, a shared with snippet field, a last viewed snippet field, an edited snippet field, a commented snippet field, a doc copy snippet field, a presence snippet field, or a logical organization snippet field.

16. The one or more non-transitory computer-readable media of claim 12, wherein the adjusting the snippet selection model to reinforce or discourage selection of the set of the plurality of snippet field types is based at least in part on detecting that the snippet did not receive a user click.

17. The one or more non-transitory computer-readable media of claim 12, the instructions further configured for:

computing a ranking score for each document in the set of documents; and wherein the adjusting the snippet selection model to reinforce or discourage selection of the set of the plurality of snippet field types is based at least in part on detecting that the corresponding document received a best ranking score among the ranking scores computed for the set of documents.

18. The one or more non-transitory computer-readable media of claim 12, the instructions further configured for:
   computing a ranking score for the corresponding document; and
   wherein the adjusting the snippet selection model to reinforce or discourage selection of the set of the plurality of snippet field types is based at least in part on the user click and the ranking score.

19. The method of claim 1, wherein the separate value for each snippet field type pertains particularly to metadata about the corresponding document.

\* \* \* \* \*